(12) United States Patent
Matsumoto et al.

(10) Patent No.: US 8,640,327 B2
(45) Date of Patent: Feb. 4, 2014

(54) PRESSURE-LOSS ADJUSTING-MEMBER INSTALLATION TOOL

(75) Inventors: Atsushi Matsumoto, Tokyo (JP); Noboru Kubo, Tokyo (JP); Ryo Yoshimura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 200 days.

(21) Appl. No.: 13/172,446

(22) Filed: Jun. 29, 2011

(65) Prior Publication Data

US 2011/0314664 A1 Dec. 29, 2011

(30) Foreign Application Priority Data

Jun. 29, 2010 (JP) ................................ 2010-147632

(51) Int. Cl.
| | | |
|---|---|---|
| B25B 27/14 | (2006.01) | |
| B25B 11/00 | (2006.01) | |
| B25B 1/24 | (2006.01) | |
| B23P 19/00 | (2006.01) | |
| B23Q 7/04 | (2006.01) | |
| B23Q 3/00 | (2006.01) | |
| F02C 7/20 | (2006.01) | |

(52) U.S. Cl.
USPC ............. 29/723; 29/281.1; 29/281.6; 29/283; 29/464; 29/700; 60/796; 60/798; 269/21; 269/266; 269/289 R

(58) Field of Classification Search
USPC ............. 29/281.1, 281.6, 283, 464, 700, 723; 60/203.1, 796, 798; 269/21, 266, 289 R
See application file for complete search history.

(56) References Cited

U.S. PATENT DOCUMENTS 4,639,993 A * 2/1987 Kapoor ........................ 29/428
4,651,400 A * 3/1987 Shields ....................... 29/426.5
(Continued)

FOREIGN PATENT DOCUMENTS

| EP | 0027984 | A2 | 5/1981 |
| EP | 2050522 | A2 | 4/2009 |
| JP | 05-240982 | S | 9/1993 |
| JP | 2008-241691 | A | 10/2008 |
| JP | 2009-075001 | A | 4/2009 |

OTHER PUBLICATIONS

European Search Report dated May 7, 2012, issued in related European Patent Application No. 11171190.9 (8 pages).

(Continued)

*Primary Examiner* — Essama Omgba
*Assistant Examiner* — Darrell C Ford
(74) *Attorney, Agent, or Firm* — Westerman, Hattori, Daniels & Adrian, LLP

(57) ABSTRACT

A pressure-loss adjusting-member installation tool having pressure-loss adjusting-member grippers that are configured to freely grip or release a pressure-loss adjusting member which is arranged at a position between a lower nozzle arranged at one end of a fuel assembly having a relatively small pressure-loss when a primary coolant flows and a lower core support plate, and which can cause the primary coolant to pass therethrough in a state with a pressure-loss being increased more than that of when the primary coolant passes through only core support plate flow holes formed on the lower core support plate; and a holding unit that holds the pressure-loss adjusting-member grippers in a same positional relationship as a relative positional relationship between the fuel assemblies arranged in plural on the lower core support plate.

3 Claims, 14 Drawing Sheets

(56) References Cited

U.S. PATENT DOCUMENTS

| | | | |
|---|---|---|---|
| 4,772,446 A * | 9/1988 | Meuschke | 376/262 |
| 6,226,343 B1 | 5/2001 | Frederickson et al. | |
| 6,445,758 B1 * | 9/2002 | Izumi et al. | 376/399 |
| 2006/0261533 A1 * | 11/2006 | Freeland | 269/266 |
| 2008/0152069 A1 | 6/2008 | Aktas et al. | |
| 2010/0091929 A1 | 4/2010 | Uda et al. | |
| 2010/0109222 A1 * | 5/2010 | Son | 269/22 |
| 2011/0317799 A1 * | 12/2011 | Matsumoto et al. | 376/352 |
| 2012/0014494 A1 * | 1/2012 | Matsumoto et al. | 376/352 |

OTHER PUBLICATIONS

Extended European Search Report dated Jul. 6, 2012, issued in related European Patent Application No. 11173422.4 (7 pages).

European Communication under Rule 71 (3) EPC (Advanced Notice of Allowance) dated Oct. 21, 2013, issued in related European Patent Application No. 11171190.9 (52 pages).

* cited by examiner

PRESSURE-LOSS ADJUSTING-MEMBER INSTALLATION TOOL

TECHNICAL FIELD

The present invention relates to a pressure-loss adjusting-member installation tool.

BACKGROUND ART

In a reactor core, which is a part that reacts fuel in a reactor, a plurality of fuel rods are arranged therein in a state of a fuel assembly having a bundle of fuel rods, and the circumference of the fuel assembly is filled with light water used as a primary coolant or a moderating material. In a pressurized water reactor (PWR), which is one type of reactors, a path at the time of extracting energy is separated into a primary cooling system and a secondary cooling system. In the primary cooling system, light water exposed to heat at the time of a fuel reaction is made high-temperature and high-pressure water by pressurizing light water circulating in the reactor including the reactor core so that light water does not boil. In the secondary cooling system, light water circulating in the secondary cooling system is exposed to heat of the high-temperature and high-pressure water in the primary cooling system so that light water is brought to a boil, and energy is extracted as high-temperature and high-pressure steam.

In the pressurized water reactor, a plurality of fuel assemblies are mounted on a lower reactor-core plate provided in a lower part of a reactor vessel, in a state with the fuel assembly being mounted on a lower nozzle. A plurality of holes are formed on the lower reactor-core plate and the lower nozzle, and light water circulating in the reactor core flows upward from below the reactor-core plate, passes through the holes in the lower reactor-core plate and then the holes in the lower nozzle, and flows toward the fuel assembly on the lower nozzle. Accordingly, the light water circulates in the primary cooling system, while being exposed to the heat at the time of a fuel reaction.

In the pressurized water reactor, at the time of circulation of light water, light water passes through the holes in the lower reactor-core plate and in the lower nozzle and flows to the circumference of the fuel assembly. However, a flow rate of light water flowing to the circumference of the fuel assembly may be different according to an arrangement position of the fuel assembly. Further, when the performance of the reactor at the time of operation is considered, it may be desired to adjust the flow rate thereof to the fuel assembly. Therefore, the conventional reactor may have a structure for adjusting the flow rate of light water flowing to the fuel assemblies.

For example, in a reactor described in Patent Literature 1, a flow-resistance changing member is provided on a lower reactor-core plate so that the flow resistance of holes formed in a central part of the lower reactor-core plate is increased with respect to the flow resistance of the holes formed on a periphery of the lower reactor-core plate, of the holes formed on the lower reactor-core plate. When light water passes through the holes in the lower reactor-core plate, such flow distribution is likely to occur that the flow rate increases in a central part than in the periphery of the lower reactor-core plate due to an influence of structures in the reactor. By providing a flow-resistance changing member to change the flow resistance in this manner, the flow distribution can be equalized.

In a fuel assembly for a pressure-loss variable pressurized water reactor described in Patent Literature 2, a pressure-loss adjusting plate having a pressure-loss adjusting element fixed thereon, which is arranged at a position corresponding to holes formed in a lower nozzle, is fixed by a screw on a lower surface of the lower nozzle. Accordingly, the flow rate of light water to the fuel assembly positioned on the lower nozzle can be adjusted for each of fuel assemblies.

CITATION LIST

Patent Literature

[PTL 1] JP 2009-75001A
[PTL 2] JP H5-240982A

SUMMARY OF INVENTION

Technical Problem

When energy is to be extracted from the fuel assembly by the reactor, it is desired that the flow rate of light water flowing from below the lower plenum toward the fuel assemblies is distributed to generate uniform flow with respect to the fuel assemblies; however, a pressure-loss in the fuel assembly may be different according to the fuel assembly. A plurality of fuel assemblies are arranged on the lower core support plate; however, the fuel assembly is not arranged at a specified position on the lower core support plate for each fuel assembly, and the arrangement position of the fuel assembly may be changed at the time of inspection. Therefore, it is desired that a structure for adjusting a flow rate of light water such as a structure for adjusting the pressure-loss when light water flows is not provided on the lower core support plate but is provided so as to be freely moved and installed according to a form of the arrangement of the fuel assemblies.

On the other hand, the fuel assemblies are arranged on the lower core support plate as described above, and the lower core support plate positioned on an upstream side in a flow direction of light water flowing around the fuel assemblies is positioned near the bottom of the reactor. Therefore, when the structure for adjusting the flow rate of light water can be freely moved according to the form of the arrangement of the fuel assemblies, a number of members for realizing such a structure need to be installed at a desired position on the lower core support plate located near the bottom of the reactor, and thus installation work may become difficult.

The present invention has been achieved to solve the above problems, and an object of the present invention is to provide a pressure-loss adjusting-member installation tool that can easily install a number of pressure-loss adjusting members at desired positions.

Solution to Problem

According to an aspect of the resent invention, a pressure-loss adjusting-member installation tool includes: a plurality of pressure-loss adjusting-member grippers being configured to freely grip or release a pressure-loss adjusting member which is arranged at a position between a lower nozzle arranged at one end of a fuel assembly having a relatively small pressure-loss when a primary coolant flows and a lower core support plate, and which can cause the primary coolant to pass therethrough in a state with a pressure-loss being increased more than that of when the primary coolant passes through only core support plate flow holes formed on the lower core support plate; and a holding unit that holds a plurality of the pressure-loss adjusting-member grippers in a same positional relationship as a relative positional relationship between the fuel assemblies arranged in plural on the lower core support plate.

According to the present invention, a number of pressure-loss adjusting-member grippers each of which can freely grip or release the pressure-loss adjusting member are held in a same positional relationship as a relative positional relationship between the fuel assemblies arranged in plural on the lower core support plate by the holding unit. Accordingly, when the pressure-loss adjusting member is to be arranged at a desired position on the lower core support plate located near the bottom of a reactor, a pressure-loss adjusting-member gripper corresponding to a position to arrange the pressure-loss adjusting member, of the pressure-loss adjusting-member grippers held by the holding unit, holds the pressure-loss adjusting member and releases it on the lower core support plate, thereby enabling to install the pressure-loss adjusting member. As a result, a number of pressure-loss adjusting members can be easily installed at desired positions.

Advantageously, in the pressure-loss adjusting-member installation tool, the holding unit includes a positioning portion relative to the lower core support plate.

According to the present invention, because the positioning unit is provided in the holding unit, positioning with respect to the lower core support plate by the holding unit can be performed easily and reliably. Accordingly, at the time of installation of the pressure-loss adjusting member, the pressure-loss adjusting-member grippers held by the holding unit can be positioned at appropriate positions on the lower core support plate easily and reliably. As a result, a number of pressure-loss adjusting members can be installed at desired positions more easily.

Advantageously, in the pressure-loss adjusting-member installation tool, the pressure-loss adjusting-member gripper grips the pressure-loss adjusting member by vertically sandwiching a horizontal member included in the pressure-loss adjusting member.

According to the present invention, because the pressure-loss adjusting-member gripper vertically sandwiches the horizontal member included in the pressure-loss adjusting member, the pressure-loss adjusting member can be gripped more reliably at the time of gripping the pressure-loss adjusting member by the pressure-loss adjusting-member grippers. As a result, a number of pressure-loss adjusting members can be installed at desired positions more reliably.

Advantageously, in the pressure-loss adjusting-member installation tool, the pressure-loss adjusting-member gripper includes a lower-side support unit capable of protruding horizontally, and at a time of gripping the pressure-loss adjusting member, a horizontal member included in the pressure-loss adjusting member is supported from below by the lower-side support unit by protruding the lower-side support unit.

According to the present invention, the horizontal member included in the pressure-loss adjusting member is supported from below by the lower-side support unit by protruding the lower-side support unit that can protrude horizontally. Therefore, the pressure-loss adjusting member can be gripped more reliably. As a result, a number of pressure-loss adjusting members can be installed at desired positions more reliably.

Advantageously, in the pressure-loss adjusting-member installation tool, the pressure-loss adjusting-member gripper includes an insertion portion, which is inserted into a hole formed in a horizontal member included in the pressure-loss adjusting member, and is provided with the lower-side support unit, and the lower-side support unit is protruded in a state with the insertion portion being inserted into a hole in the pressure-loss adjusting member, thereby supporting the horizontal member from below.

According to the present invention, the pressure-loss adjusting-member gripper supports the horizontal member from below by horizontally protruding the lower-side support unit in a state with the insertion portion including the lower-side support unit being inserted into the hole formed in the horizontal member included in the pressure-loss adjusting member. Therefore, at the time of supporting the horizontal member included in the pressure-loss adjusting member from below, the horizontal member can be supported more reliably. Accordingly, the pressure-loss adjusting member can be gripped more reliably. As a result, a number of pressure-loss adjusting members can be installed at desired positions more reliably.

Advantageous Effects of Invention

The pressure-loss adjusting-member installation tool according to the present invention can easily install a number of pressure-loss adjusting members at desired positions.

DESCRIPTION OF EMBODIMENTS

Exemplary embodiments of a pressure-loss adjusting-member installation tool according to the present invention will be explained below in detail with reference to the accompanying drawings. The present invention is not limited to the following embodiments. In addition, constituent elements in the following embodiments include elements replaceable by those skilled in the art, or substantially the same elements.

[Embodiment]

Figure 1:
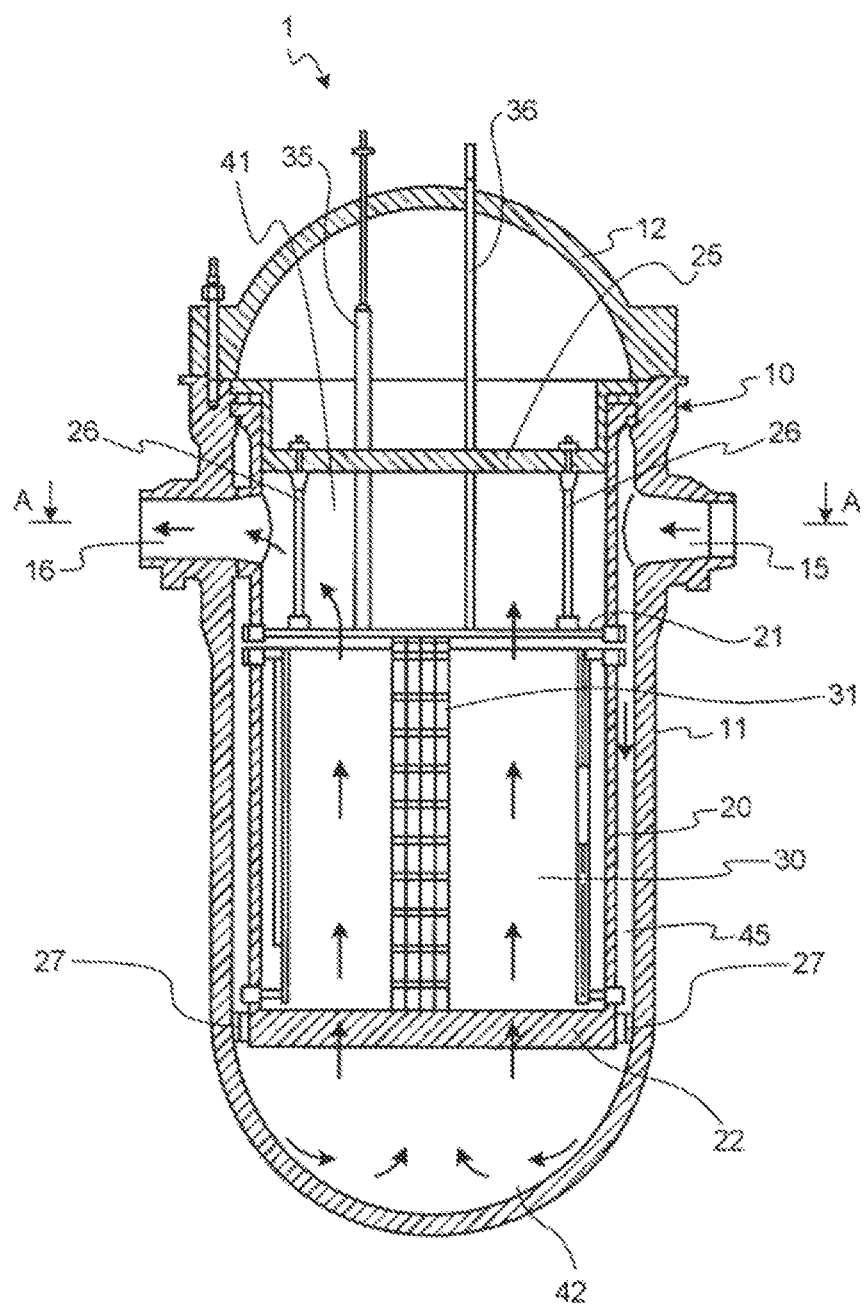
FIG. 1 is a schematic diagram of a reactor in which a pressure-loss adjusting member is installed by an installation tool according to an embodiment of the present invention.

FIG. 1 is a schematic diagram of a reactor to be attached with a pressure-loss adjusting member by an installation tool according to an embodiment of the present invention. In the following explanations, an upper part in an installed state of a reactor 1 at the time of use is designated as an upper part in respective units, and a lower part in the installed state of the reactor 1 at the time of use is designated as a lower part in the respective units. The reactor 1 shown in FIG. 1 is a pressurized water reactor in which a path for extracting energy is separated into a primary cooling system and a secondary cooling system. An outline of a nuclear power plant using the pressurized water reactor is explained below. In the pressurized water reactor, light water is used as a reactor primary coolant and a neutron moderator, and by providing a pressurizer (not shown) in the primary cooling system, which is a circulation path of light water, light water can be turned into high-temperature and high-pressure water, which does not boil in all over a reactor core in the primary cooling system. In the primary cooling system, the high-temperature and high-pressure water is fed to a steam generator (not shown), which is a part that performs heat exchange with the secondary cooling system, to perform heat exchange with light water circulating in the secondary cooling system. In the secondary cooling system, steam is generated due to heat exchange, and the generated steam is fed to a turbine generator (not shown), to generate power by the turbine generator.

In the reactor 1 according to the embodiment, which is provided as the pressurized water reactor, a reactor vessel 10 provided as a pressure vessel includes a reactor vessel body 11 and a reactor vessel lid 12 mounted on the reactor vessel body 11 and capable of being opened and closed with respect to the reactor vessel body 11, so that core internals can be inserted therein. The reactor vessel body 11 is formed substantially in a cylindrical shape with an upper part thereof in a vertical direction at the time of installation of the reactor 1 being opened and a lower part thereof being in a spherical shape and closed. An inlet nozzle 15 and an outlet nozzle 16 for feeding and discharging light water (a primary coolant) as primary cooling water, which is used in the primary cooling system, are formed near an upper end thereof, which is an end on the open side.

Figure 2:
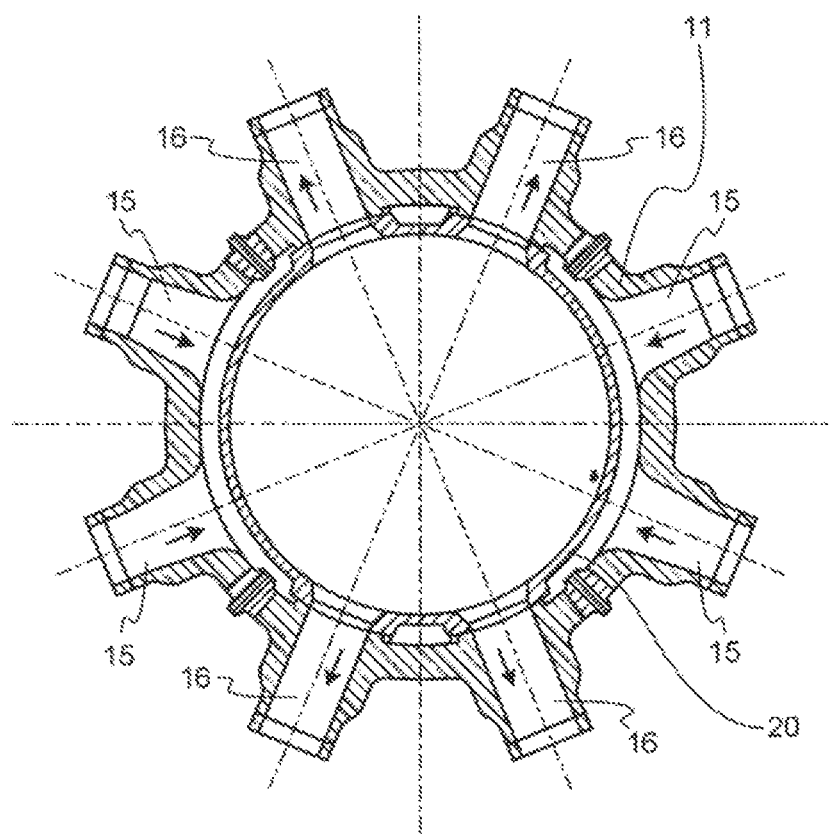
FIG. 2 is a sectional view along a line A-A in FIG. 1.

FIG. 2 is a sectional view along a line A-A in FIG. 1. Four inlet nozzles 15 and four outlet nozzles 16 are formed in the reactor vessel body 11 and eight nozzles in total are arranged with equal intervals on the outer periphery of the reactor vessel body 11 formed substantially in the cylindrical shape. In more detail, the inlet nozzles 15 and the outlet nozzles 16 are arranged in such a manner that two of the same type of nozzles are continuously arranged, and when two nozzles of the same type continuously arranged are designated as one set, the set of nozzles are alternately arranged.

Below the inlet nozzles 15 and the outlet nozzles 16 in the reactor vessel body 11, a core barrel 20 formed substantially in a cylindrical shape is arranged, and the core barrel 20 is arranged with a predetermined gap from an inner surface of the reactor vessel body 11. That is, the core barrel 20 formed substantially in the cylindrical shape has a smaller diameter than that of the reactor vessel body 11 formed substantially in the cylindrical shape, and by arranging the core barrel 20 in the reactor vessel body 11 so that central axes of both cylindrical forms match with each other, there is a gap between the core barrel 20 and the inner surface of the reactor vessel body 11.

An upper core plate 21 formed in a disk shape and having many flow holes (not shown) formed therein is connected to an upper part of the core barrel 20. A lower core support plate 22 similarly formed in a disk shape is connected to a lower part of the core barrel 20, and core support plate flow holes 23 (see FIG. 3), which are flow holes in the lower core support plate 22, are formed in plural. An upper core support 25 positioned in the upper part of the core barrel 20 and formed in a disk shape is fixed inside of the reactor vessel body 11, and the upper core plate 21 is suspended from the upper core support 25 and supported via a plurality of reactor-core support rods 26. That is, the core barrel 20 connected to the upper core plate 21 is also suspended and supported by the upper core support 25, because the upper core plate 21 is suspended and supported by the upper core support 25 via the reactor-core support rods 26. On the other hand, the lower core support plate 22 is positioned and held by a plurality of radial support keys 27 with respect to the inner surface of the reactor vessel body 11, and thus the core barrel 20 is positioned and held by the radial support keys 27 with respect to the inner surface of the reactor vessel body 11.

A reactor internal 30 includes the core barrel 20, the upper core plate 21, and the lower core support plate 22 provided in this manner, and many fuel assemblies 31 are arranged in the reactor internal 30. The fuel assembly 31 is formed by bundling a number of fuel rods in a reticular pattern by a support grid, with an upper nozzle (not shown) being fixed to an upper end thereof and a lower nozzle 50 (see FIG. 4) being fixed to a lower end thereof. The fuel assembly 31 also includes a control-rod guide tube into which a control rod is inserted, and an incore-instrumentation guide tube into which an incore-instrumentation detector is inserted, in addition to the fuel rods.

The upper core support 25 supports a number of control-rod-cluster guide tubes 35 and a number of incore-instrumentation guide tubes 36 in such a state that the control-rod-cluster guide tubes 35 and the incore-instrumentation guide tubes 36 penetrate through the upper core support 25. Among these elements, the control-rod-cluster guide tube 35 is provided as a guide tube for a cluster-type control rod (not shown) in which a plurality of control rods are collectively driven, and a control-rod-cluster drive shaft extending from a control-rod drive unit (not shown) provided in the reactor vessel lid 12 is extended to the fuel assembly 31, passing in the control-rod-cluster guide tube 35. The control rod is fitted to a bottom end of the control-rod-cluster drive shaft and inserted into the control-rod guide tube included in the fuel assembly 31. Further, the incore-instrumentation guide tube is provided as a guide tube for incore neutron instrumentation (not shown) for measuring neutrons in the reactor vessel 10, and a bottom end thereof is extended to the fuel assembly 31.

In the reactor vessel 10, a portion positioned above the reactor internal 30 and communicating with the outlet nozzle 16 is formed as an upper plenum 41, and a hemispherical space positioned below the reactor internal 30 and formed of the lower core support plate 22 and an inner surface of a spherical closed portion below the reactor vessel body 11 is formed as a lower plenum 42. A portion formed between the reactor vessel 10 and the core barrel 20 and communicating with the inlet nozzle 15 and the lower plenum 42 is formed as a downcomer 45. That is, the upper plenum 41 is sectioned by the core barrel 20, the upper core support 25, and the upper core plate 21, and communicates with the outlet nozzle 16 and also communicates with the reactor internal 30 via a number of flow holes formed on the upper core plate 21. The lower plenum 42 is sectioned by the lower core support plate 22 as a bottom of the core barrel 20 and the reactor vessel body 11, and communicates with the reactor internal 30 via a number of flow holes formed on the lower core support plate 22. The downcomer 45 is sectioned by the reactor vessel body 11 and a side wall of the core barrel 20, with an upper part thereof communicating with the inlet nozzle 15 and a lower part thereof communicating with the lower plenum 42.

Figure 3:
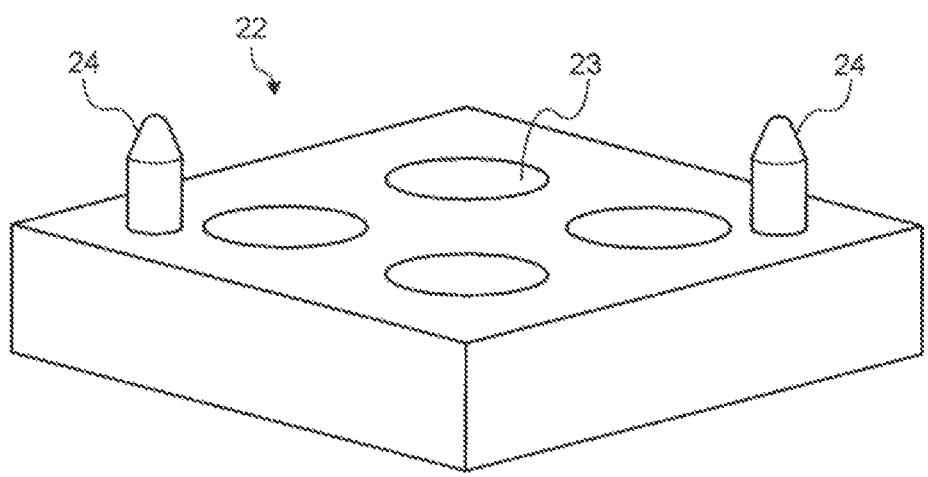
FIG. 3 is a detailed diagram of relevant parts of a lower core support plate shown in FIG. 1.

FIG. 3 is a detailed diagram of relevant parts of the lower core support plate shown in FIG. 1. A number of core support plate flow holes, which are flow holes bored in a thickness direction of the plate, that is, in a vertical direction, are formed on the lower core support plate 22. Further, the lower core support plate 22 is provided so that a number of the fuel assemblies 31 can be arranged thereon, and fuel assembly guide pins 24 used for the arrangement of the fuel assemblies 31 are provided on an upper surface of the lower core support plate 22, which is a surface for arranging the fuel assemblies 31.

The fuel assembly guide pin 24 protrudes upward on an upper surface of the lower core support plate 22 in a round-bar shape, and a top end is formed in a tapered shape and tapered off to a point. The fuel assembly guide pin 24 can be provided in such a manner that the fuel assembly 31 can be arranged at an appropriate position by being used for positioning of the lower nozzle 50 at the arrangement position, which is fixed to the lower end of the fuel assembly 31, at the time of arranging the fuel assembly 31 on the lower core support plate 22. That is, the fuel assembly guide pin 24 can be provided so that the lower nozzle 50 can be arranged at an appropriate position in a portion where the lower nozzle 50 is arranged on the lower core support plate 22.

Figure 4:
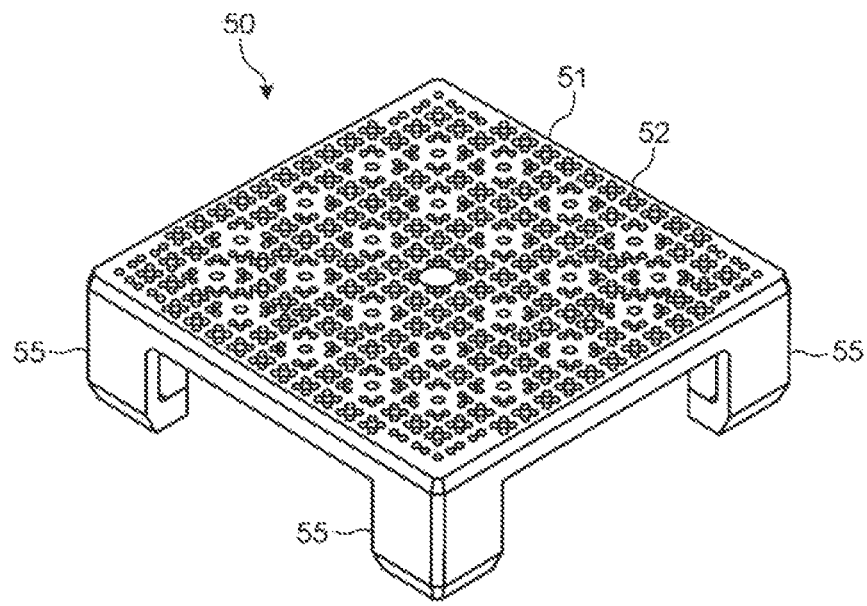
FIG. 4 is a perspective view on an upper surface side of a lower nozzle.
Figure 5:
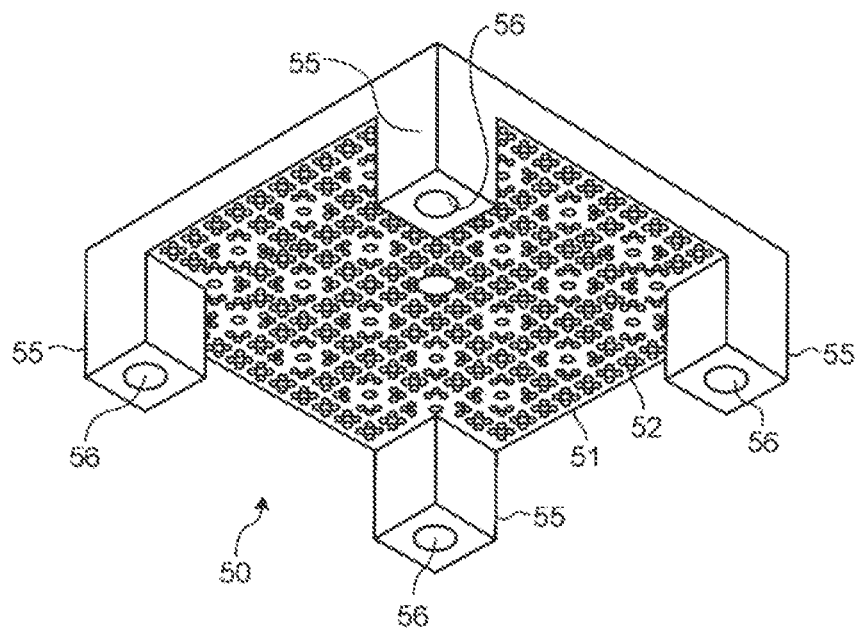
FIG. 5 is a perspective view on a lower surface side of the lower nozzle.

FIG. 4 is a perspective view on an upper surface side of the lower nozzle. FIG. 5 is a perspective view on a lower surface side of the lower nozzle. The lower nozzle 50 arranged at the lower end of the fuel assembly 31 includes a nozzle portion 51 formed substantially in a rectangular plate shape, and a plurality of legs 55 formed on the nozzle portion 51. A number of nozzle flow holes 52 penetrating in a thickness direction of the plate are formed in the nozzle portion 51. The legs 55 are provided on one surface of the nozzle portion 51, and four legs 55 protrudes respectively from four corners on the surface in the thickness direction of the nozzle portion 51 with a same height.

A positioning hole 56 formed in a height direction of the leg 55 is formed at an end opposite to the end on the nozzle portion 51 side is formed in the leg 55. The positioning hole 56 opens at the end of the leg 55 as a hole, into which the fuel assembly guide pin 24 formed on the lower core support plate 22 is inserted, and is formed with a predetermined depth. The lower nozzle 50 formed in this manner is fixed to the lower end of the fuel assembly 31 in such an orientation that the leg 55 side is positioned on the lower side and a surface of the nozzle portion 51 on which the leg is formed faces upward, and the fuel assembly 31 is mounted on a surface opposite to the surface on the leg 55 side in the nozzle portion 51.

When the lower nozzle 50 is mounted on the lower core support plate 22 in such an orientation that the leg 55 side is positioned on the lower side, the fuel assembly guide pin 24 formed on the lower core support plate 22 are inserted into two positioning holes 56, respectively, of four positioning holes 56 formed in the four legs 55. That is, the legs 55 protrude from four corners of the nozzle portion 51 formed in a rectangular shape, and the fuel assembly guide pins 24 are respectively inserted into two positioning holes 56 formed in the legs 55 protruding from two corners having a diagonal relationship in the nozzle portion 51.

With the above arrangements, the two fuel assembly guide pins 24 formed in a portion where the lower nozzle 50 is arranged on the lower core support plate 22 and the two positioning holes 56 formed in the two legs 55 positioned in the diagonal relationship in the nozzle portion 51 of the lower nozzle 50 have substantially the same positional relationship relative to each other. When the lower nozzle 50 is arranged on the lower core support plate 22, the two fuel assembly guide pins 24 are inserted into the two positioning holes 56 to arrange the lower nozzle 50.

Figure 6:
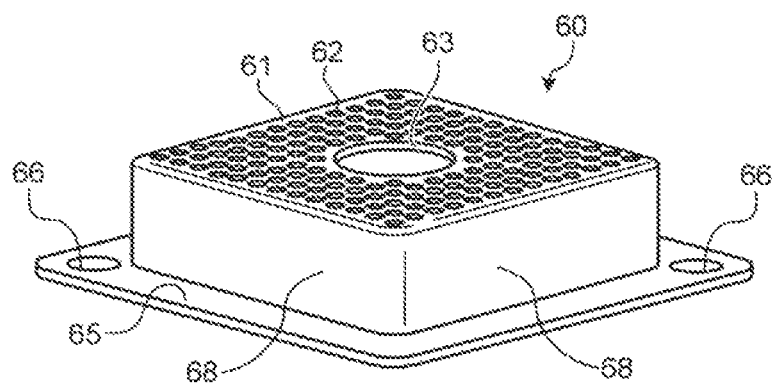
FIG. 6 is a perspective view of a pressure-loss adjusting member.

FIG. 6 is a perspective view of the pressure-loss adjusting member. The lower nozzle 50 and the lower core support plate 22 are provided in such a manner that the lower nozzle 50 can be arranged on the lower core support plate 22 with a pressure-loss adjusting member 60 being located therebetween. The pressure-loss adjusting member 60 is explained below. The pressure-loss adjusting member 60 includes a pressure-loss adjusting unit 61 formed substantially in a rectangular plate-like shape, and a fitting unit 65 formed in a hollow square plate-like shape, with an inner periphery thereof being formed in the same shape as that of an outer periphery of the pressure-loss adjusting unit 61. The pressure-loss adjusting unit 61 and the fitting unit 65 are formed on different planes.

Specifically, these pressure-loss adjusting unit 61 and fitting unit 65 are provided with both surfaces being parallel to each other, and at positions different in an orthogonal direction to the both surfaces, and as viewed in an orthogonal direction to the both surfaces, the outer periphery of the pressure-loss adjusting unit 61 and the inner periphery of the fitting unit 65 are positioned overlapping on each other. The pressure-loss adjusting member 60 is formed by connecting the outer periphery of the pressure-loss adjusting unit 61 and the inner periphery of the fitting unit 65 by a side portion 68, which is a plane connecting these portions, in a state with the pressure-loss adjusting unit 61 and the fitting unit 65 being positioned in such a manner.

The pressure-loss adjusting unit 61 further includes a plurality of pressure-loss adjusting holes 62 penetrating in a thickness direction of the plate of the pressure-loss adjusting unit 61. The pressure-loss adjusting holes 62 are provided by forming a number of holes having a relatively small diameter, specifically, considerably smaller diameter than that of the core support plate flow holes 23. An instrumentation hole 63, through which instrumentation parts to be used at the time of operating the reactor 1 are inserted, is formed near a central part as viewed in plan view in the pressure-loss adjusting unit 61. The instrumentation hole 63 is formed in a larger diameter than that of the pressure-loss adjusting holes 62, and penetrates in the thickness direction of the plate of the pressure-loss adjusting unit 61 as in the pressure-loss adjusting holes 62.

Further, engagement holes 66 penetrating in a thickness direction of the plate are formed in the fitting unit 65 near two corners forming one of opposing corners, of two sets of opposing corners of the fitting unit 65 formed in the hollow square plate-like shape. These engagement holes 66 are formed one each, in total two, near the two corners of the fitting unit 65, in the same positional relationship as the relative positional relationship between the positioning holes 56 formed in plural in the lower nozzle 50.

That is, the two engagement holes 66 formed near the two corners of the pressure-loss adjusting member 60 are formed in the same positional relationship as the relative positional relationship between the positioning holes 56 into which the two fuel assembly guide pins 24 are inserted at the time of arranging the lower nozzle 50, of the four positioning holes 56 formed in the lower nozzle 50. Accordingly, the two fuel assembly guide pins 24 that can be inserted into the positioning holes 56 in one lower nozzle 50, of the fuel assembly guide pins 24 formed in plural on the lower core support plate 22, can be inserted into the two engagement holes 66 formed in the pressure-loss adjusting member 60. The pressure-loss adjusting member 60 is formed in this manner, in other words, the pressure-loss adjusting unit 61 and the fitting unit 65 are provided at different positions in an inserting direction of the fuel assembly guide pins 24 into the engagement holes 66.

Figure 7:
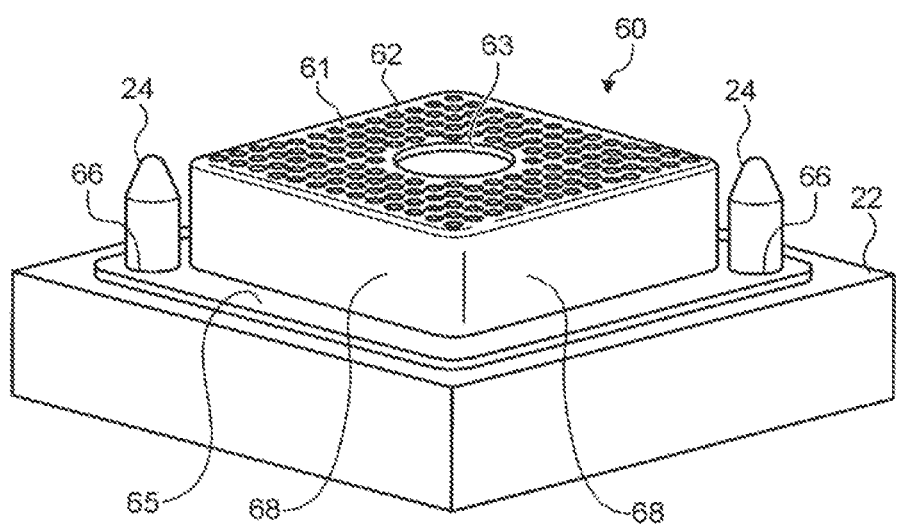
FIG. 7 is a perspective view of a state where the pressure-loss adjusting member shown in FIG. 6 is arranged on a lower core support plate.
Figure 8:
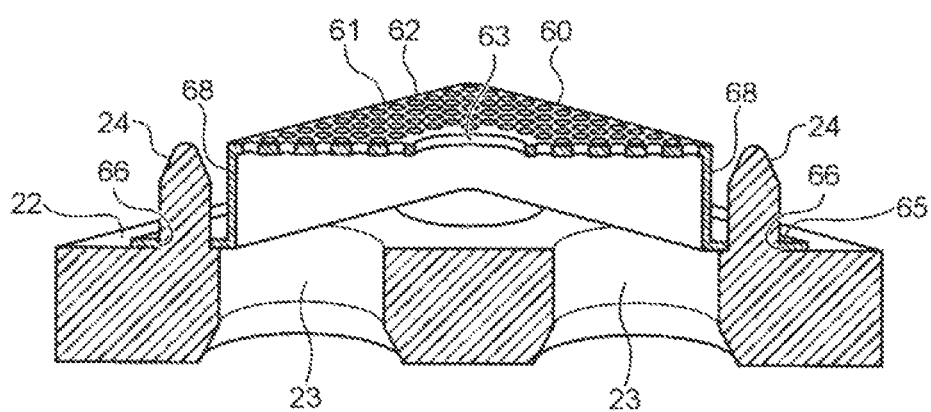
FIG. 8 is a sectional view of relevant parts shown in FIG. 7.

FIG. 7 is a perspective view of a state where the pressure-loss adjusting member shown in FIG. 6 is arranged on the lower core support plate. FIG. 8 is a sectional view of relevant parts shown in FIG. 7. When the pressure-loss adjusting member 60 formed in this manner is to be arranged on the lower core support plate 22, the fuel assembly guide pins 24 on the lower core support plate 22 are inserted into the engagement holes 66 formed in the fitting unit 65, in such an orientation that the fitting unit 65 is positioned on the lower core support plate 22 side and the pressure-loss adjusting unit is away from the lower core support plate 22. The pressure-loss adjusting unit 61 and the fitting unit 65 are at different positions in the inserting direction of the fuel assembly guide pins 24 into the engagement holes 66. Therefore, when the fuel assembly guide pins 24 are inserted into the engagement holes 66 in this orientation and the fitting unit 65 is brought into contact with the lower core support plate 22, the pressure-loss adjusting unit 61 is in a state away from the lower core support plate 22. The arrangement of the pressure-loss adjusting member 60 on the lower core support plate 22 is performed in the state with the pressure-loss adjusting unit 61 being away from the lower core support plate 22.

Because the side portion 68 is formed in the pressure-loss adjusting member 60, when the fitting unit 65 is brought into contact with the lower core support plate 22 and arranged on the lower core support plate 22, the space between the core support plate flow holes 23 formed on the lower core support plate 22 and the pressure-loss adjusting unit 61 communicates with the outside only from the portion of the core support plate flow holes 23 and the pressure-loss adjusting holes 62, thereby causing a substantially sealed state relative to the outside.

Further, because the fitting unit 65 is formed by a thin plate, when the pressure-loss adjusting member 60 is arranged on the lower core support plate 22 by inserting the fuel assembly guide pins 24 into the engagement holes 66, the fuel assembly guide pins 24 penetrate the engagement holes 66 and protrude upward from the fitting unit 65. Therefore, the lower nozzle 50 can be arranged from above of the pressure-loss adjusting member 60 arranged on the lower core support plate 22. In this case, the fuel assembly guide pins 24 penetrating the engagement holes 66 are inserted into two positioning holes 56 of the four positioning holes 56 to arrange the lower nozzle 50 on the pressure-loss adjusting member 60, in such an orientation that ends of four legs 55 of the lower nozzle 50 can be brought into contact with near the four corners of the fitting unit 65 formed in a hollow square. That is, the ends of the legs 55 formed in plural are arranged in contact with the fitting unit 65 of the pressure-loss adjusting member 60 so that the positioning holes 56 and the engagement holes 66 communicate with each other.

Because the lower nozzle 50 can be arranged on the lower core support plate 22 via the pressure-loss adjusting member 60, the fuel assembly 31 fixed with the lower nozzle 50 at the lower end thereof can be arranged on the lower core support plate 22 via the pressure-loss adjusting member 60 from above of the pressure-loss adjusting member 60 in a state with the pressure-loss adjusting member 60 being arranged on the lower core support plate 22. Further, because a plurality of the fuel assembly guide pins 24 are formed on the lower core support plate 22, a number of the fuel assemblies 31 can be arranged on the lower core support plate 22.

At the time of operating the reactor 1, light water flows around the fuel assemblies 31. However, the pressure-loss when light water flows may be different according to the fuel assembly 31. The pressure-loss adjusting member 60 is not arranged with respect to all the fuel assemblies 31 arranged in plural on the lower core support plate 22, but arranged between the lower nozzle 50 fixed to the fuel assembly 31 having a relatively small pressure-loss and the lower core support plate 22. When the pressure-loss adjusting member 60 is arranged on the lower core support plate 22, the pressure-loss adjusting unit 61 is away from the lower core support plate 22. Therefore, when the pressure-loss adjusting member 60 is arranged between the lower nozzle 50 and the lower core support plate 22, the pressure-loss adjusting unit 61 is positioned near the nozzle portion 51 of the lower nozzle 50.

Figure 9:
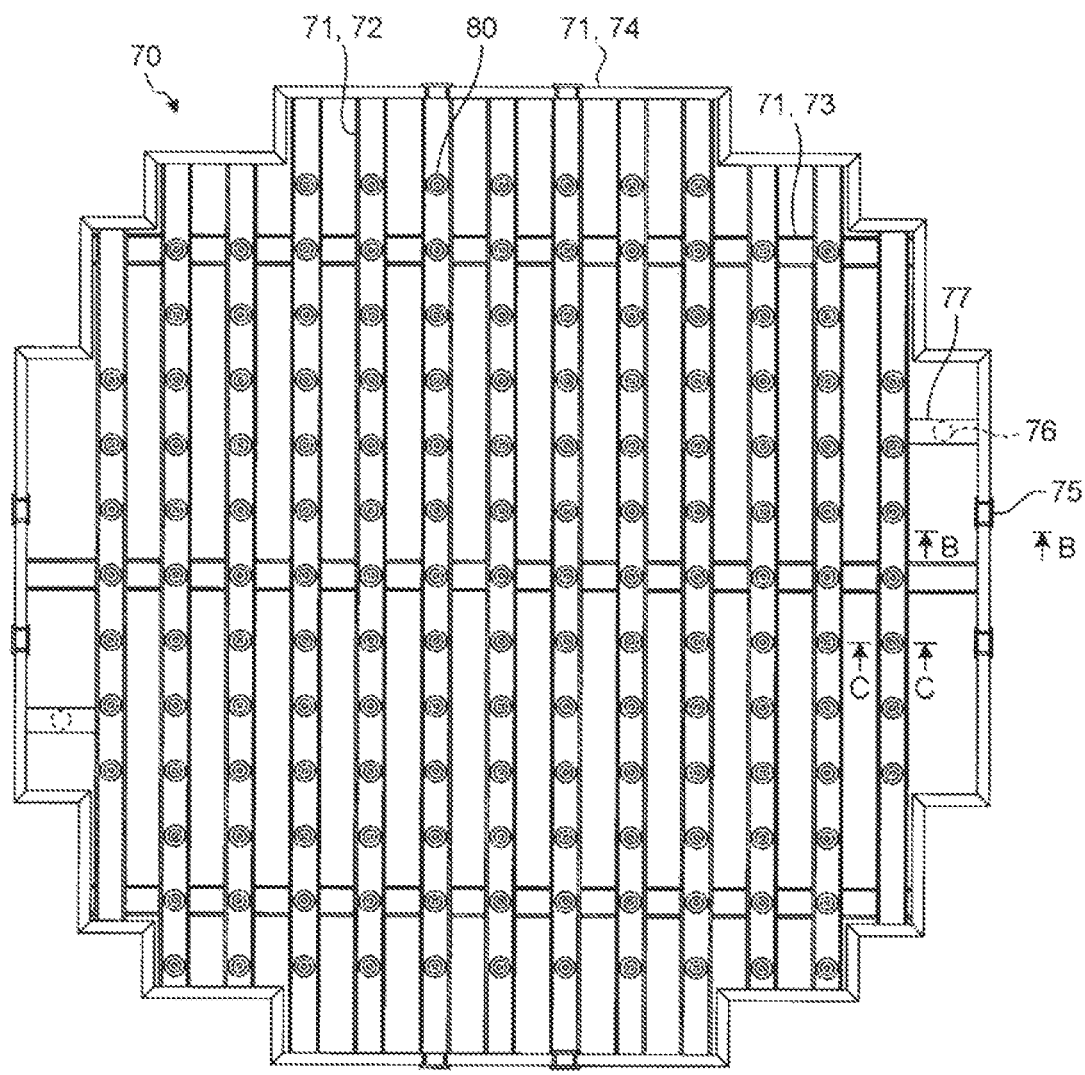
FIG. 9 is a plan view of an installation tool to be used at the time of installing the pressure-loss adjusting member shown in FIG. 6 on the lower core support plate.
Figure 10:
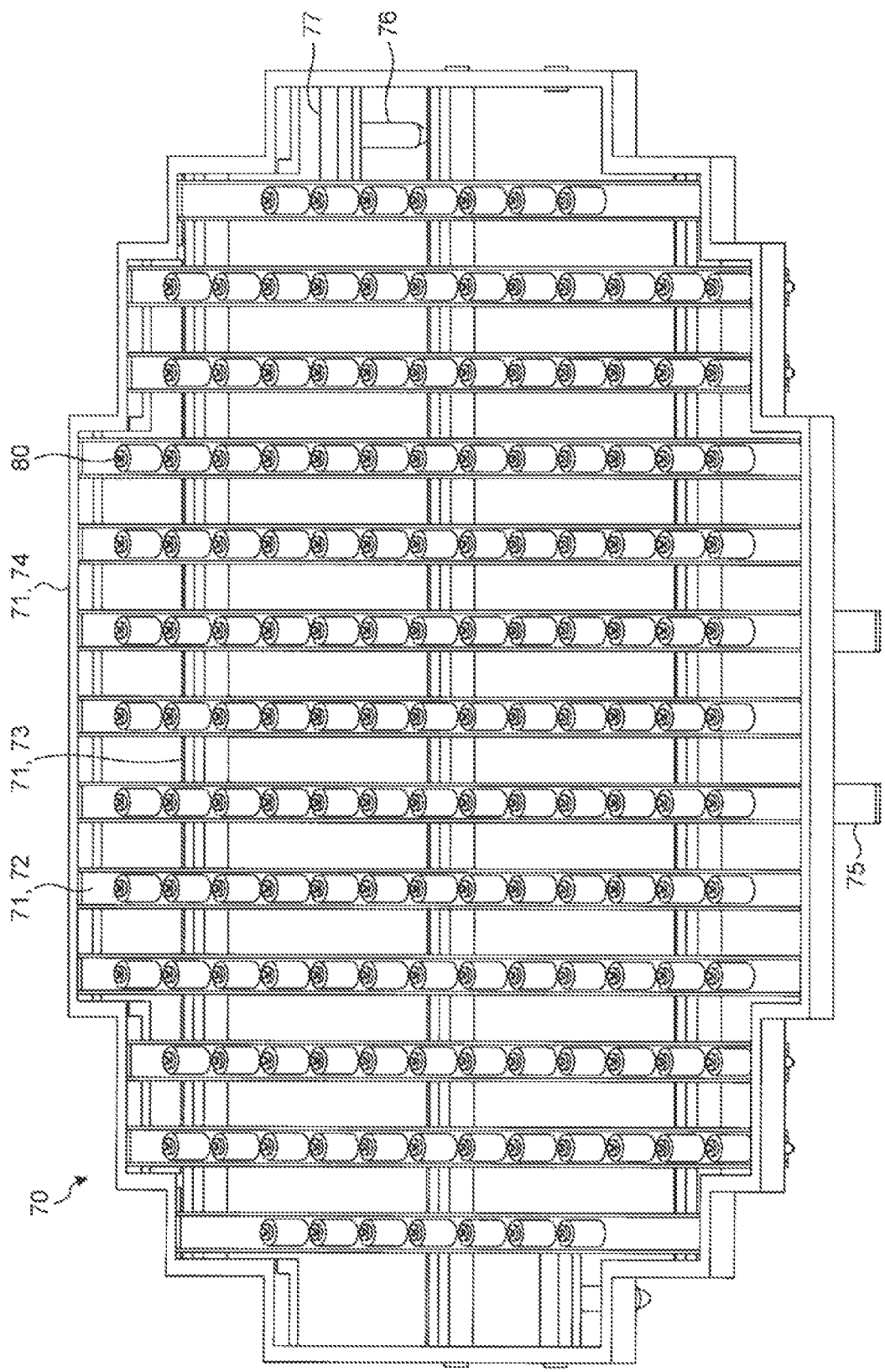
FIG. 10 is a perspective view of the installation tool shown in FIG. 9.
Figure 11:
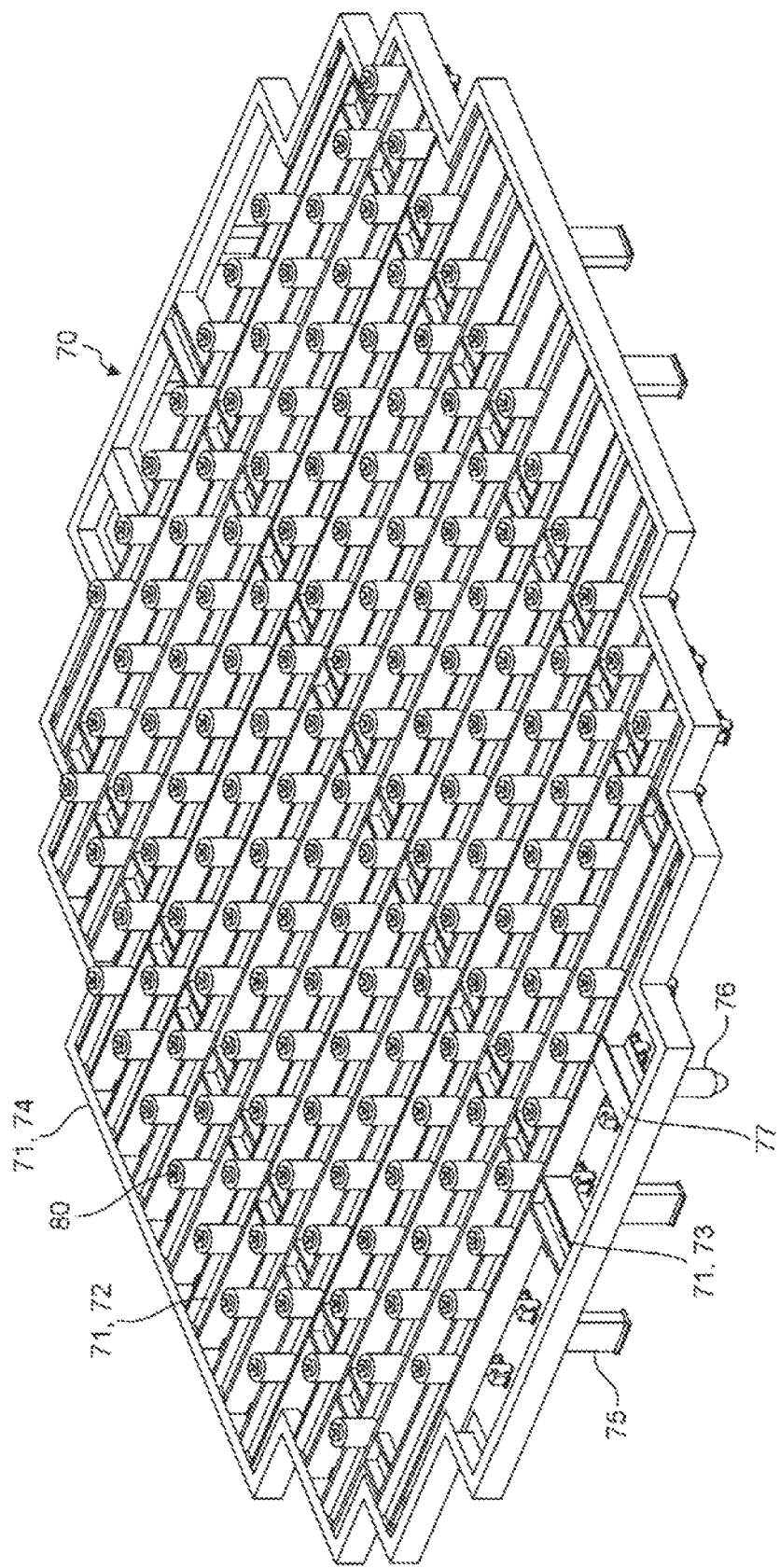
FIG. 11 is a perspective view of the installation tool shown in FIG. 9.

FIG. 9 is a plan view of an installation tool to be used at the time of installing the pressure-loss adjusting member shown in FIG. 6 on the lower core support plate. FIGS. 10 and 11 are perspective views of the installation tool shown in FIG. 9. An installation tool 70, which is a tool for installing the pressure-loss adjusting member, to be used at the time of installing the pressure-loss adjusting member 60 shown in FIG. 6 on the lower core support plate 22, is explained below. The installation tool 70 is provided by holding a number of adjusting member grippers 80, which are pressure-loss adjusting-member grippers capable of freely gripping or releasing the pressure-loss adjusting member 60, by a frame 71 as a holding unit in the same positional relationship as the relative positional relationship between the fuel assemblies arranged in plural on the lower core support plate 22.

In this manner, the frame 71 that holds the adjusting member grippers 80 includes a plurality of main frames 72 to which the adjusting member grippers 80 is fitted, an outer frame 74 forming an outline of the frame 71, to which the main frame 72 is connected, and a sub-frame 73 that reinforces the main frames 72 connected to the outer frame 74. The outer frame 74 is formed by combining channels or the like, and is formed in a frame-like shape slightly smaller than an inner diameter of the core barrel 20. A plurality of tool legs 75 formed of a member extending downward are provided at predetermined positions of the outer frame 74 formed in this manner. The tool legs 75 are provided as legs at the time of arranging the installation tool 70.

The main frame 72 is formed of wide-flange beam steel. A plurality of the main frames 72 are arranged in parallel in an inner part of the outer frame 74, and opposite ends thereof are connected to the outer frame 74. In the main frame 72 provided in this manner, a flange of the wide-flange beam steel is formed in a vertical direction, and the web thereof is formed in a horizontal direction.

The sub-frame 73 is formed of wide-flange beam steel as in the main frame 72. The sub-frame 73 is arranged between the main frames 72 in a length equal to a gap between adjacent main frames 72 arranged in parallel, with opposite ends thereof being connected to the main frames 72. The sub-frame 73 is also provided between the main frames 72 positioned at the opposite ends of the main frames 72 arranged in parallel and the outer frame 74. One end of the sub-frame 73 is connected to the main frame 72, and the other end is connected to the outer frame 74. The sub-frames 73 provided in this manner are formed between the respective main frames 72 so as to be continuous in a length direction of the sub-frame 73, and are formed in a plurality of lines in a length direction of the main frame 72.

A plurality of the adjusting member grippers 80 held by the frame 71 are held by being fitted to the main frames 72. Specifically, the adjusting member grippers 80 are fitted to the respective main frames 72 arranged in parallel with a predetermined gap in the length direction of the main frame 72. The adjusting member grippers 80 fitted to the main frames 72 in this manner are fitted to the web of the wide-flange beam steel constituting the main frame 72 and provided in a horizontal direction.

Figure 12:
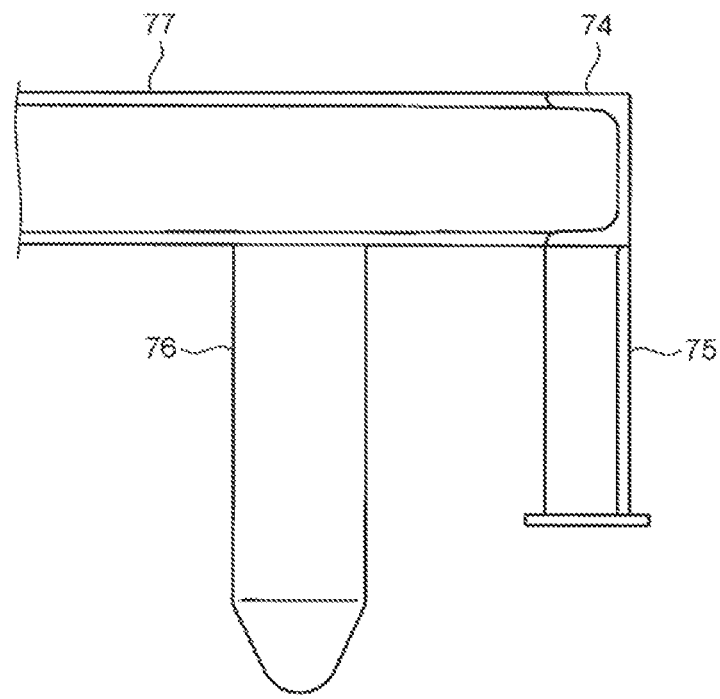
FIG. 12 is a sectional view along a line B-B in FIG. 9.

FIG. 12 is a sectional view along a line B-B in FIG. 9. The frame 71 is provided with a positioning pin 76, which is a positioning portion used for positioning of the pressure-loss adjusting member 60 with respect to the lower core support plate 22, at the time of installing the pressure-loss adjusting member 60 on the lower core support plate 22. The positioning pin 76 is extended downward in a round-bar shape at a predetermined position in the installation tool 70, and is provided as a pin having a tapered shape near an end. On the other hand, a tool positioning hole 78 (see FIG. 17) that engages with the positioning pin 76 by inserting the positioning pin 76 into the tool positioning hole 78 is formed on the lower core support plate 22, and positioning of the installation tool 70 with respect to the lower core support plate 22 is performed by inserting the positioning pin 76 into the tool positioning hole 78 in the lower core support plate 22 and engaging it with the tool positioning hole 78.

The arrangement of the positioning pin 76 is performed as described below. For example, at the time of installing the pressure-loss adjusting member 60 by using the installation tool 70, if the tool positioning hole 78 in the lower core support plate 22 is formed at a position corresponding to near the end of the installation tool 70 and the frame 71 is not provided in this portion, a positioning-pin support unit 77 that supports the positioning pin 76 is provided in this portion. The positioning-pin support unit 77 is formed of a steel material to which the positioning pin 76 can be fitted, and the positioning pin 76 is fitted to the positioning-pin support unit 77 so as to be extended downward from the positioning-pin support unit 77. Accordingly, the positioning pin 76 is provided on the frame 71.

When the tool positioning hole 78 in the lower core support plate 22 is formed at positions where the main frame 72, the sub-frame 73, and the outer frame 74 are provided when the pressure-loss adjusting member 60 is installed by using the installation tool 70, the positioning pin 76 can be fitted directly to the main frame 72 and the like.

Figure 13:
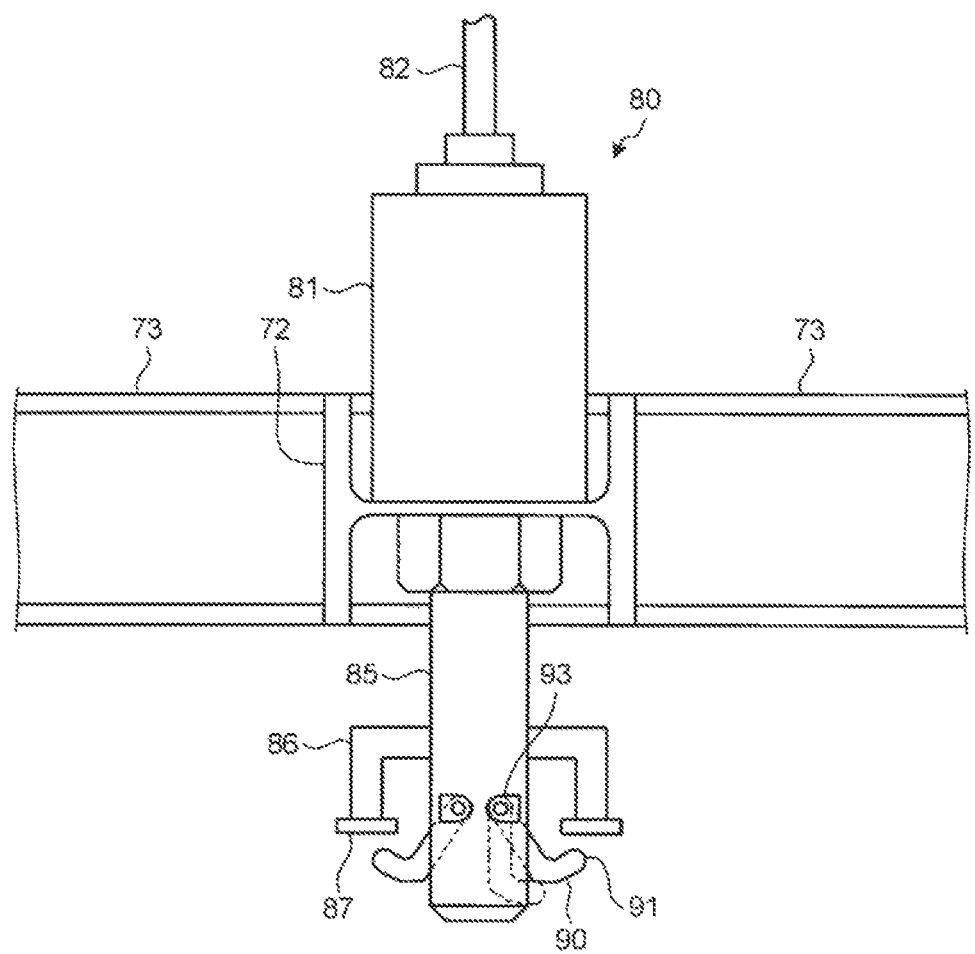
FIG. 13 is a sectional view along a line C-C in FIG. 9.
Figure 14:
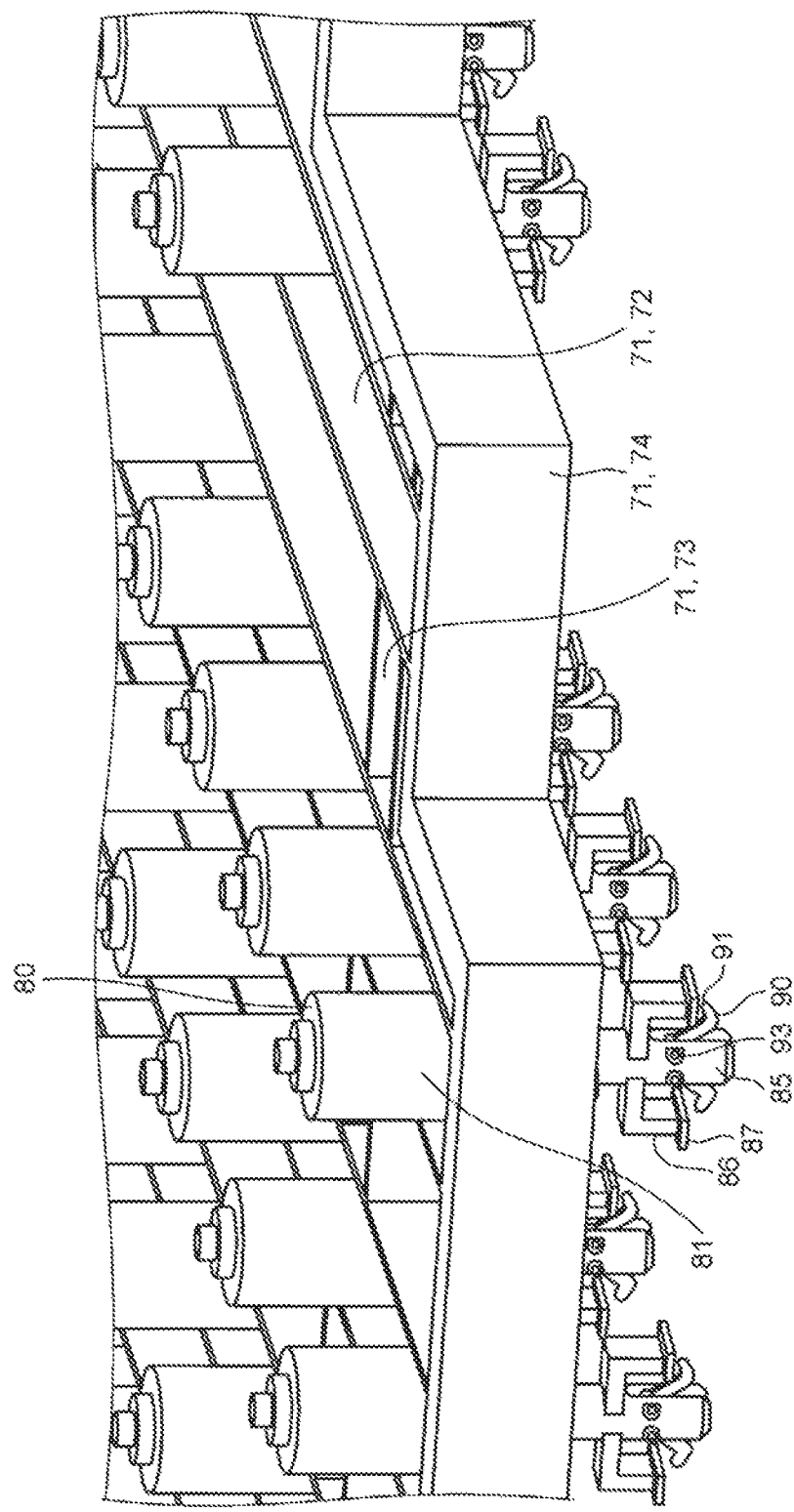
FIG. 14 is a detailed perspective view of relevant parts of the installation tool shown in FIG. 9.

FIG. 13 is a sectional view along a line C-C in FIG. 9. FIG. 14 is a detailed perspective view of relevant parts of the installation tool shown in FIG. 9. The adjusting member gripper 80 includes a gripper body 81 fitted to the main frame 72, which is a body part of the adjusting member gripper 80, and an insertion portion 85 extending from the gripper body 81. An air hose 82, which is a flow path of air used for switching operation to grip or release the pressure-loss adjusting member 60 by the adjusting member grippers 80 is connected to the gripper body 81. The opposite end of the air hose 82 is connected to an air pressure controller (not shown) that can adjust an air pressure used for activation of the adjusting member gripper 80.

The insertion portion 85 is formed in a round-bar shape extending downward from the gripper body 81 when the adjusting member gripper 80 is fitted to the main frame 72. A predetermined range at least near the end of the insertion portion 85 formed in the round-bar shape is formed to have a smaller diameter than that of the instrumentation hole 63 formed in the pressure-loss adjusting member 60.

Further, an upper-side support unit 86 and a lower-side support unit 90 used at the time of gripping the pressure-loss adjusting member 60 are provided in the insertion portion 85. The upper-side support unit 86 is provided by being fixed to a predetermined position of the insertion portion 85 in a direction from the end portion toward the gripper body 81. The upper-side support unit 86 fixed to the insertion portion 85 protrudes outward in a radial direction of the insertion portion 85 formed in the round-bar shape, and is arranged at two positions shifted by 180° in a circumferential direction, centering on a shaft of the insertion portion 85, when the insertion portion 85 is viewed in an axial direction.

In the upper-side support unit 86, an upper-side contact unit 87, which is a contact unit with respect to a member supported by the upper-side support unit 86, is directed toward the end of the insertion portion 85, so that it can support a member positioned on the end side of the insertion portion 85 than the upper-side support unit 86. In other words, the upper-side support unit 86 can provide bearing power with respect to a member supported by the upper-side support unit 86, in a direction from the gripper body 81 toward the end of the insertion portion 85.

The lower-side support unit 90 is provided on the end side of the insertion portion 85 than the upper-side support unit 86. The lower-side support unit 90 is not fixed to the insertion portion 85, different from the upper-side support unit 86, so that the lower-side support unit 90 can turn. That is, a rotation shaft 93 is provided in a direction orthogonal to an axial direction of the insertion portion 85, and the lower-side support unit 90 can turn about the rotation shaft 93. Therefore, a lower-side contact unit 91, which is a contact unit with respect to a member supported by the lower-side support unit 90 and is positioned at the end of the lower-side support unit 90, turns about the rotation shaft 93 centering on the rotation shaft 93, when the lower-side support unit 90 turns. Specifically, because a major part of the lower-side support unit 90 including the lower-side contact unit 91 is positioned on the end side of the insertion portion 85 than the rotation shaft 93, the lower-side support unit 90 mainly turns on the end side of the insertion portion 85 than the rotation shaft 93.

In the insertion portion 85, a notch (not shown) into which the lower-side support unit 90 enters is formed, and when an angle of the lower-side support unit 90 becomes an angle approaching the insertion portion 85, a portion of the lower-side support unit 90 interfering with the insertion portion 85 enters into this notch. Accordingly, the lower-side support unit 90 can freely turn. The lower-side support unit 90, the rotation shaft 93, and the notch of the insertion portion 85 formed in this manner are formed at two positions shifted by 180° in a circumferential direction, centering on the shaft of the insertion portion 85, when the insertion portion 85 is viewed from an axial direction, as in the upper-side support unit 86.

Because the rotation shaft 93 is provided in the insertion portion 85, when a turning angle of the lower-side support unit 90 becomes an angle at which the lower-side contact unit 91 overlaps on the rotation shaft 93 when the insertion portion 85 is viewed from an axial direction, a considerable portion of the lower-side support unit 90 enters into the notch. Therefore, a protruding amount of the lower-side support unit 90 from the insertion portion 85 decreases when the insertion portion 85 is viewed from the axial direction.

On the other hand, when the turning angle of the lower-side support unit 90 becomes an angle at which the lower-side contact unit 91 is at a position close to the position of the rotation shaft 93 when the insertion portion 85 is viewed from an axial direction, the protruding amount of the lower-side support unit 90 from the insertion portion 85 increases when the insertion portion 85 is viewed from the axial direction. When the turning angle becomes such an angle, the lower-side contact unit 91 of the lower-side support unit 90 is directed toward the gripper body 81, so that a member positioned on the gripper body 81 side of the insertion portion 85 than the lower-side support unit 90 can be supported. In other words, when the turning angle becomes such an angle, the lower-side support unit 90 can provide bearing power with respect to a member supported by the lower-side support unit 90, in a direction from the end of the insertion portion 85 toward the gripper body 81.

The lower-side support unit 90 can turn about the rotation shaft 93 in this manner. The lower-side support unit 90 turns due to an air pressure controlled by the air pressure controller connected to the air hose 82, thereby enabling to change the rotation angle thereof by adjusting the air pressure.

The reactor 1 in which the pressure-loss adjusting member 60 is installed by the installation tool 70 according to the present embodiment has the configuration described above, and an effect thereof is explained below. When the reactor 1 is operated, while circulating light water used as a primary coolant and a neutron moderator, a fissile material such as uranium 235 or plutonium contained in the fuel assembly 31 as a fuel constituting the fuel assembly 31 is subjected to a nuclear fission reaction. When the nuclear fission reaction is carried out in this manner, a control-rod drive unit provided in the reactor vessel lid 12 moves a control-rod-cluster drive shaft, to adjust an insertion amount of the control rod into the fuel assembly 31. In this manner, the nuclear fission reaction in the reactor internal 30 is controlled. When the fissile material fissions, thermal energy is generated. However, because circulating light water is filled around the fuel assembly 31, the thermal energy is transmitted to light water around the fuel assembly 31. Accordingly, light water filled in the reactor vessel 10 is heated. High-temperature light water heated by the thermal energy generated at the time of the nuclear fission reaction in this way is discharged from the outlet nozzle 16, and fed to a steam generator.

That is, the fissile material contained in the fuel assembly 31 fissions to discharge neutrons, and light water used as the neutron moderator and the primary coolant in the primary cooling system reduces the kinetic energy of the discharged high-speed neutrons to turn the neutrons into thermal neutrons, thereby facilitating new nuclear fission and drawing generated heat to cool the fuel assembly 31.

The control rod is provided so that the number of neutrons generated in the reactor internal 30 can be adjusted by absorbing neutrons discharged at the time of nuclear fission of the fissile material. For example, when the insertion amount of the control rod into the fuel assembly 31 is increased, the amount of neutrons absorbed by the control rod increases, thereby decreasing the number of neutrons that cause nuclear fission of the fissile material. On the contrary, when the control rod is moved in a pulling-out direction to decrease the insertion amount of the control rod into the fuel assembly 31, because the amount of neutrons absorbed by the control rod decreases, the number of neutrons that cause nuclear fission of the fissile material increases. Accordingly, the frequency of nuclear fission of the fissile material can be changed. Therefore, at the time of operating the reactor 1, a nuclear fission reaction is controlled by adjusting the insertion amount of the control rod, to adjust the amount of thermal energy generated due to the nuclear fission reaction.

At the time of operating the reactor 1, light water is circulated in the primary cooling system. The light water flows into the reactor vessel body 11 from the four inlet nozzles 15, flows downward in the downcomer 45 communicating with the inlet nozzles to reach the lower plenum 42, and then changes the flow direction to upward due to the spherical inner surface of the lower plenum 42. Accordingly, light water moves upward from the lower plenum 42, and after having passed through the lower core support plate 22, flows into the reactor internal 30. Light water flowing into the reactor internal 30 absorbs thermal energy generated from the fuel assemblies 31 arranged in the reactor internal 30 to cool the fuel assemblies 31, and moves up to the upper core plate 21 in a state of high-temperature light water. The high-temperature light water having reached the upper core plate 21 passes through the upper core plate 21 and moves up to the upper plenum 41, and is discharged from the reactor vessel body 11 through the outlet nozzles 16.

In the reactor vessel body 11, light water circulating in the primary cooling system passes through the lower core support plate 22 and the upper core plate 21, and flows from the lower plenum 42 to the upper plenum 41. When passing through the lower core support plate 22, light water passes through the core support plate flow holes 23 formed on the lower core support plate 22. Accordingly, light water flows from the lower plenum 42 to the reactor internal 30, and flows around the fuel assemblies 31.

The lower nozzle 50 fixed to the fuel assembly 31 is arranged on the lower core support plate 22, thereby providing fuel assemblies 31 in the reactor internal 30 in plural. However, there are fuel assemblies 31 in which the pressure-loss adjusting member 60 is arranged between the lower nozzle 50 and the lower core support plate 22 and the fuel assemblies 31 that does not include the pressure-loss adjusting member 60, according to the fuel assembly 31. Therefore, when light water having passed through the lower core support plate 22 flows to the fuel assemblies 31, the flowing state is different according to the presence of the pressure-loss adjusting member 60.

The fuel assembly 31 in which the pressure-loss adjusting member 60 is not arranged between the lower nozzle 50 and the lower core support plate 22 is explained first. Light water having passed through the core support plate flow holes 23 in the lower core support plate 22 moves up directly to the nozzle portion 51 of the lower nozzle 50. Light water having reached the nozzle portion 51 passes through the nozzle flow holes 52 formed in the nozzle portion 51 in plural, and flows around the fuel assemblies 31.

On the other hand, in the fuel assembly 31 in which the pressure-loss adjusting member 60 is arranged between the lower nozzle 50 and the lower core support plate 22, almost all of light water having passed through the core support plate flow holes 23 in the lower core support plate 22 flows toward the pressure-loss adjusting unit 61 and passes through the pressure-loss adjusting holes 62. That is, because the side portion 68 is formed in the pressure-loss adjusting member 60 and the space between the core support plate flow holes 23 and the pressure-loss adjusting unit 61 is substantially sealed relative to the outside, light water having passed through the core support plate flow holes 23 does not flow to the outside of the space, and is directed toward the pressure-loss adjusting unit 61 to pass through the pressure-loss adjusting holes 62.

Because the pressure-loss adjusting holes 62 are provided by forming a number of holes having a relatively small diameter, when light water having passed through the core support plate flow holes 23 passes through the pressure-loss adjusting holes 62, light water is split. That is, when light water passes through the pressure-loss adjusting holes 62 having a relatively small diameter, the flow of light water is divided into a plurality of flows and split, and then flows toward the nozzle portion 51 of the lower nozzle 50. In this manner, when light water passes through the pressure-loss adjusting holes 62, light water is split by the pressure-loss adjusting holes 62. Therefore, when light water passes through the core support plate flow holes 23 and the pressure-loss adjusting holes 62, the resistance increases to increase the pressure-loss than a case that light water passes through only the core support plate flow holes 23.

Therefore, the comprehensive pressure-loss when light water flows from the lower plenum 42 to the fuel assemblies 31 is equalized between all the fuel assemblies 31 by arranging the pressure-loss adjusting member 60 to the fuel assembly 31 having a small pressure-loss. Accordingly, light water flowing from the lower plenum 42 to the reactor internal 30 does not flow much to the fuel assembly 31 having a small pressure-loss, is distributed to the fuel assemblies 31, and flows with respect to a plurality of the fuel assemblies 31 substantially uniformly.

Further, because the side portion 68 is formed in the pressure-loss adjusting member 60, the space between the core support plate flow holes 23 and the pressure-loss adjusting unit 61 positioned inside of the side portion 68 is substantially sealed relative to the outside. Therefore, when light water flows from the lower plenum 42 toward the fuel assembly 31, passing through the core support plate flow holes 23 in the lower core support plate 22, light water hardly flows in and out between the space inside of the side portion 68 and the outside of the space. Therefore, when the flow rate of light water decreases than that in a portion where the pressure-loss adjusting member 60 is not arranged, by arranging the pressure-loss adjusting member 60 to increase the pressure-loss, inflow of light water from the outside of this portion to the space inside of the side portion 68 is suppressed.

At the time of arranging the pressure-loss adjusting member 60 on the lower core support plate 22, the pressure-loss adjusting unit 61 is in a state away from the lower core support plate 22, and the pressure-loss adjusting unit 61 is positioned near the nozzle portion 51 of the lower nozzle 50. Therefore, light water having passed through the core support plate flow holes 23 and the pressure-loss adjusting holes 62, that is, only light water with the pressure-loss being increased flows to the nozzle flow holes 52 of the lower nozzle 50. Accordingly, light water flowing from the lower plenum 42 to the reactor internal 30 flows more uniformly to the fuel assemblies 31. Light water flowing substantially uniformly to the fuel assemblies 31 uniformly cools the fuel assemblies 31 or uniformly generates thermal neutrons. Therefore, the reactor 1 can be stably operated due to the effect of light water.

Figure 15:
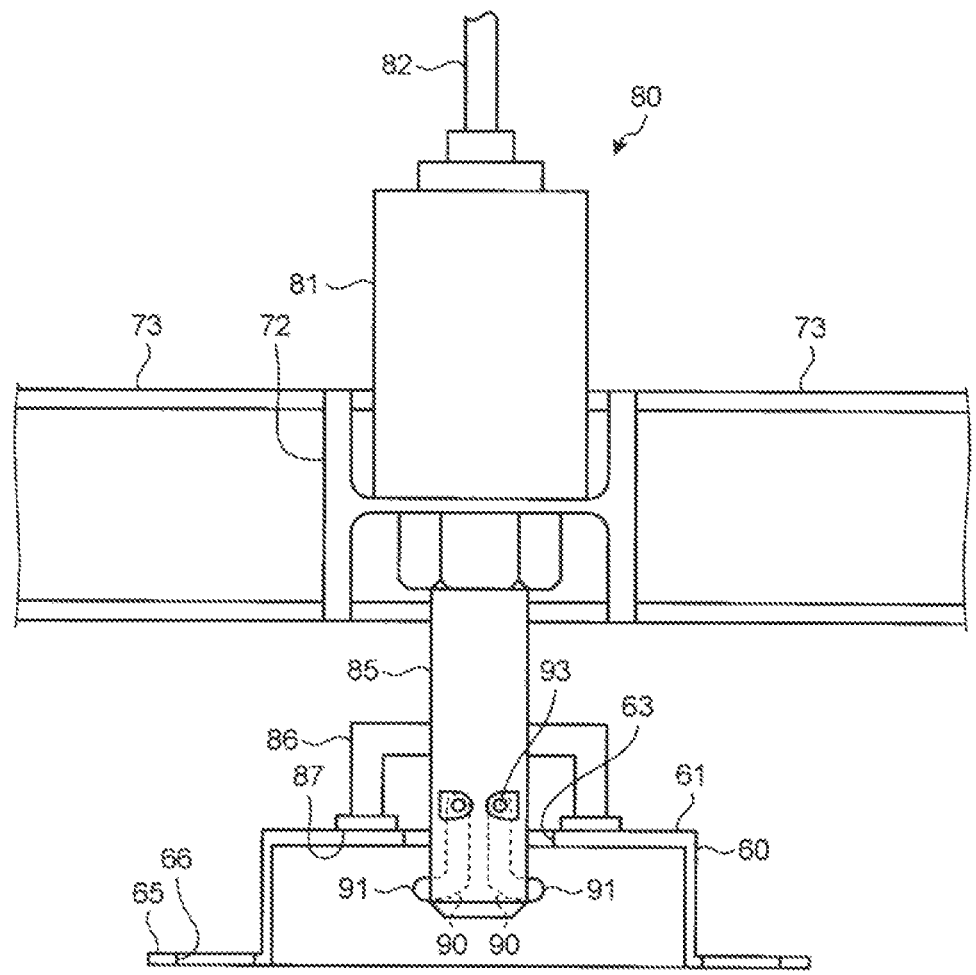
FIG. 15 is a schematic diagram for explaining a case where a pressure-loss adjusting member is gripped an adjusting member gripper shown in FIG. 13.

An installation method at the time of installing the pressure-loss adjusting member 60 that can increase the pressure-loss of light water flowing to the fuel assembly 31 on the lower core support plate 22 by using the installation tool 70 is explained next. FIG. 15 is a schematic diagram for explaining a case where the pressure-loss adjusting member is gripped the adjusting member gripper shown in FIG. 13. When the pressure-loss adjusting member 60 is installed on the lower core support plate 22 by using the installation tool 70, the adjusting member gripper 80 grips and installs the pressure-loss adjusting member 60. When the adjusting member gripper 80 is to grip the pressure-loss adjusting member 60, the air pressure controller controls the air pressure that acts on the adjusting member gripper 80 to close the lower-side support unit 90. That is, the lower-side support unit 90 is turned so that the lower-side contact unit 91 is positioned right below the rotation shaft 93 to decrease the protruding amount of the lower-side support unit 90 from the insertion portion 85. In this way, when the lower-side support unit 90 is closed, the shape of the insertion portion 85 including the lower-side support unit 90, when the insertion portion 85 in a portion where the lower-side support unit 90 is provided is viewed from an axial direction, is such that the insertion portion 85 is housed in the instrumentation hole 63 formed in the pressure-loss adjusting member 60.

The installation tool 70 inserts the insertion portion 85 of the adjusting member gripper 80, corresponding to a portion where the pressure-loss adjusting member 60 is arranged on the lower core support plate 22, into the instrumentation hole 63 in the pressure-loss adjusting member 60, in a state with the lower-side support unit 90 of each of the adjusting member grippers 80 being closed. That is, the adjusting member grippers 80 are provided in the same positional relationship as the relative positional relationship between the fuel assemblies 31 arranged in plural on the lower core support plate 22, and are provided at positions corresponding to the respective fuel assemblies 31. Among these elements, the insertion portion 85 of the adjusting member gripper 80 corresponding to the position of a fuel assembly having a relatively small pressure-loss is inserted into the instrumentation hole 63 of the pressure-loss adjusting member 60.

The upper-side support unit 86 is provided at a position closer to the gripper body 81 than the lower-side support unit 90. The upper-side support unit 86 protrudes outward in a radial direction of the insertion portion 85. Therefore, in the adjusting member gripper 80, the upper-side contact unit 87 of the upper-side support unit 86 comes in contact with an upper surface of the pressure-loss adjusting unit 61, which is a horizontal member included in the pressure-loss adjusting member 60 including the insertion portion 85 inserted into the instrumentation hole 63.

Figure 16:
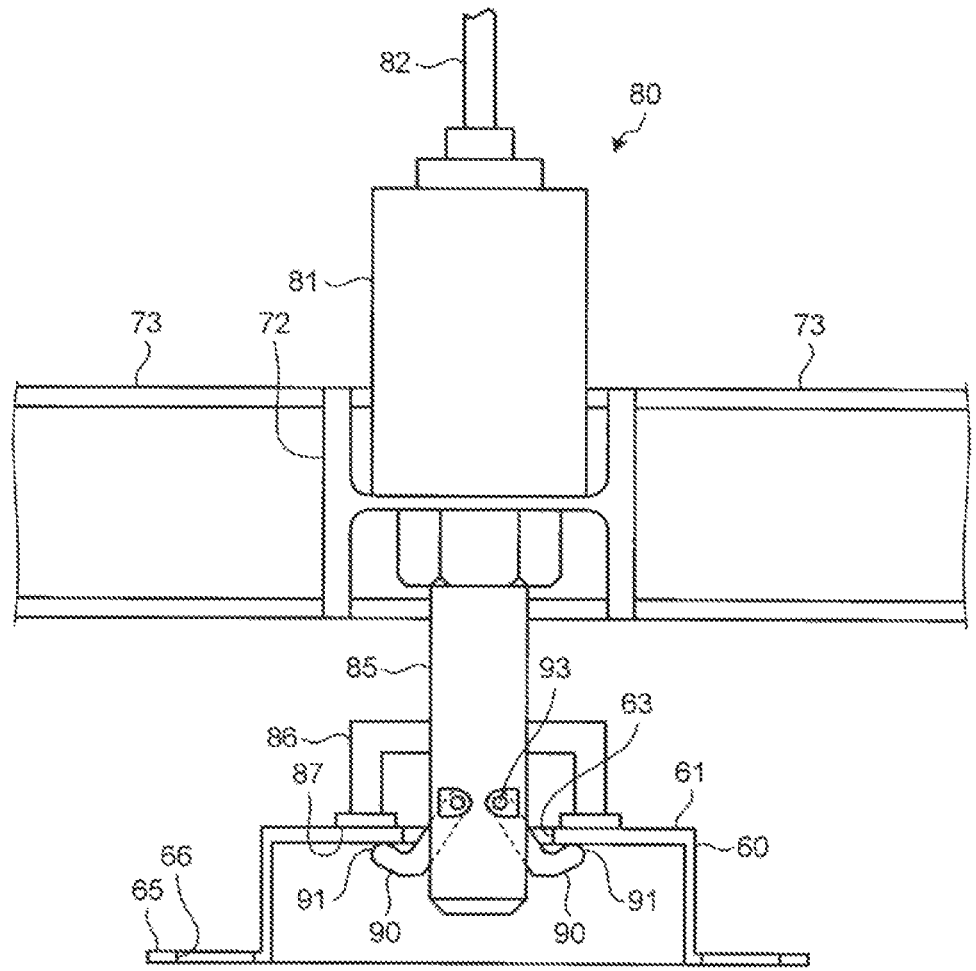
FIG. 16 is a schematic diagram for explaining a state where the pressure-loss adjusting member is gripped by the adjusting member gripper shown in FIG. 15.

FIG. 16 is a schematic diagram for explaining a state where the pressure-loss adjusting member is gripped by the adjusting member gripper shown in FIG. 15. When the insertion portion 85 of the adjusting member gripper 80 is inserted into the instrumentation hole 63 of the pressure-loss adjusting member 60 until the upper-side contact units 87 come in contact with the pressure-loss adjusting member 60, the air pressure controller controls the air pressure that acts on the adjusting member gripper 80 to open the lower-side support units 90. When the lower-side support units 90 are turned in an opening direction, the lower-side support units 90 are turned in a direction that the lower-side contact units 91 approach the upper-side contact units 87. When the lower-side support units 90 are opened, the protruding amount thereof from the insertion portion 85 increases. Therefore, the distance between the lower-side contact units 91 of two lower-side support units 90 becomes larger than the diameter of the instrumentation hole 63 of the pressure-loss adjusting member 60. Accordingly, the lower-side contact units 91 of the lower-side support units 90 come in contact with the lower surface of the pressure-loss adjusting unit 61, which is the horizontal member included in the pressure-loss adjusting member 60, to support the pressure-loss adjusting unit 61 from below.

Therefore, the adjusting member gripper 80 grips the pressure-loss adjusting member 60 by vertically sandwiching the pressure-loss adjusting unit 61 of the pressure-loss adjusting member 60 by the upper-side support unit 86 and the lower-side support unit 90. The installation tool 70 grips the pressure-loss adjusting member 60 by the adjusting member gripper 80 corresponding to a portion where the pressure-loss adjusting member 60 is arranged on the lower core support plate 22 in this way.

Figure 17:
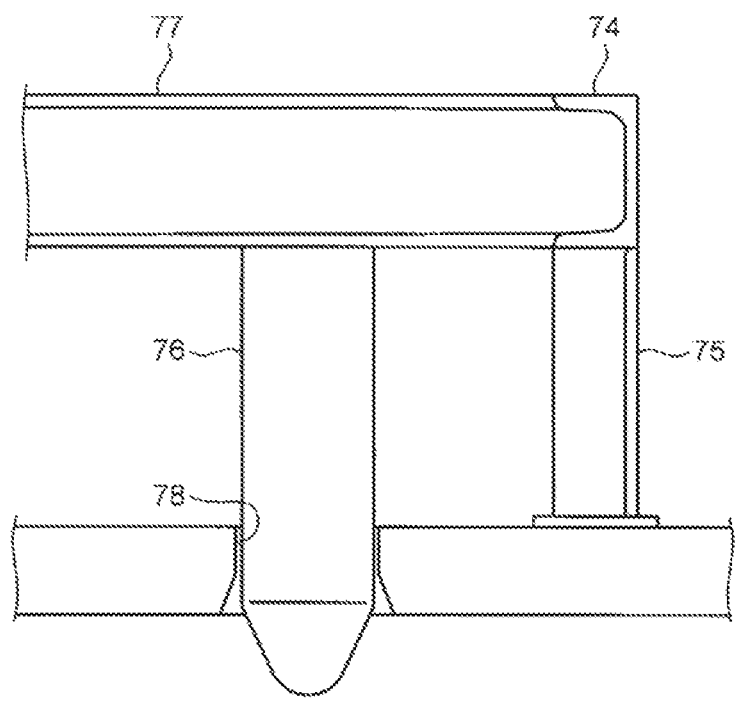
FIG. 17 is a schematic diagram for explaining positioning of the installation tool at the time of installing the pressure-loss adjusting member by using the installation tool.

FIG. 17 is a schematic diagram for explaining positioning of the installation tool at the time of installing the pressure-loss adjusting member by using the installation tool. When the pressure-loss adjusting member 60 gripped by the installation tool 70 is to be arranged on the lower core support plate 22, the installation tool 70 in a state of gripping the pressure-loss adjusting member 60 is positioned with respect to the lower core support plate 22. When positioning of the installation tool 70 is to be performed, the positioning pin 76 provided on the installation tool 70 is inserted into the tool positioning hole 78 formed on the lower core support plate 22. A relative positional relationship between the tool positioning hole 78 in the lower core support plate 22 and the arrangement position of the fuel assemblies 31 is the same as that between the positioning pin 76 in the installation tool 70 and the adjusting member grippers 80.

Because the positioning pin 76 of the installation tool 70 has a tapered shape near the end, the end of the positioning pin 76 enters into the tool positioning hole 78. When the end of the positioning pin 76 is to be inserted further, the center of the positioning pin 76 is led so as to approach the center of the tool positioning hole 78. Therefore, when the positioning pin 76 of the installation tool 70 is inserted into the tool positioning hole 78 formed on the lower core support plate 22, the respective adjusting member grippers 80 of the installation tool 70 are positioned above the arrangement positions of the respective fuel assemblies 31. Accordingly, the pressure-loss adjusting member 60 gripped by the adjusting member gripper 80 is positioned on the arrangement position of the fuel assembly 31 having a small pressure-loss on the lower core support plate 22.

Figure 18:
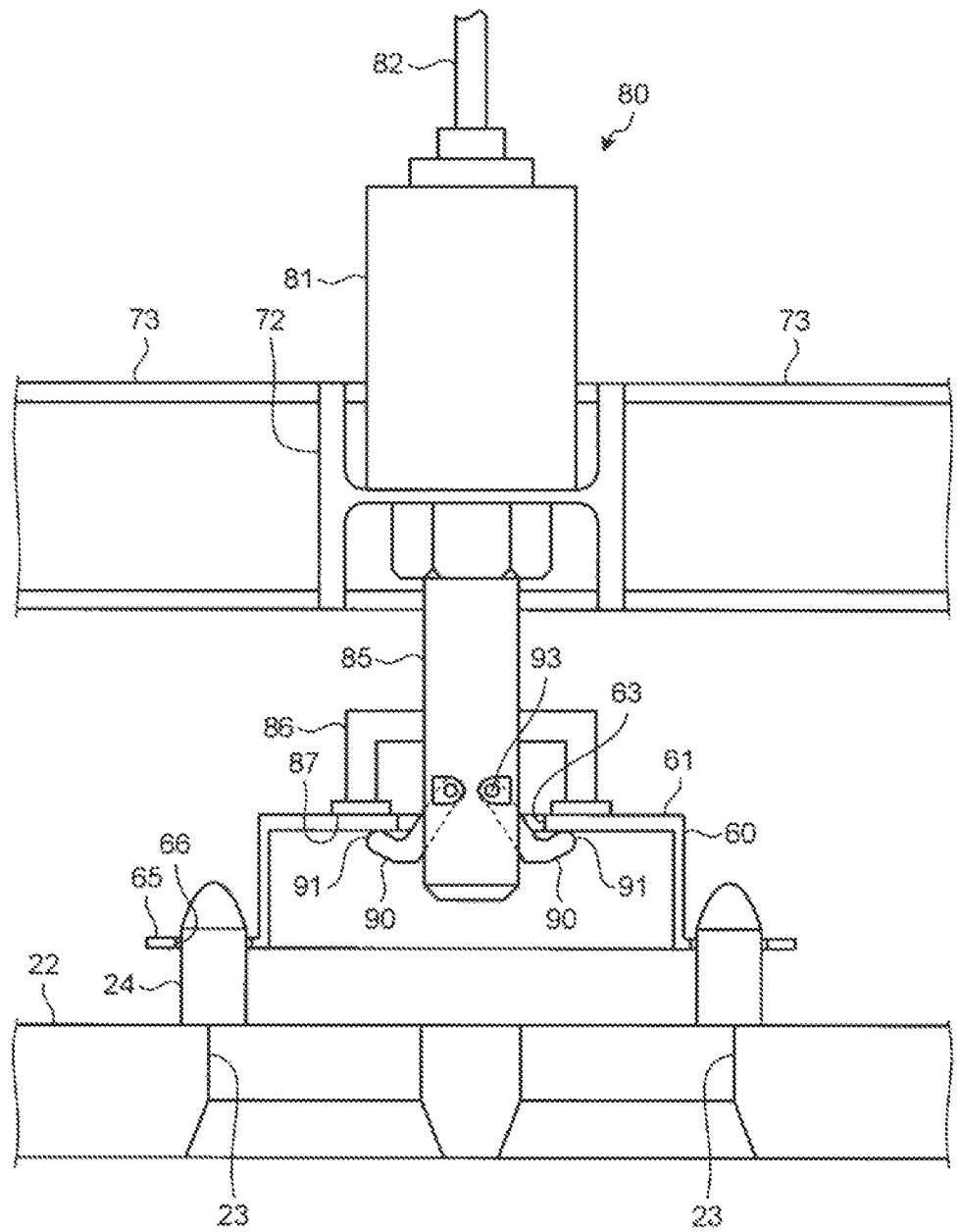
FIG. 18 is a schematic diagram for explaining a case where the pressure-loss adjusting member is installed by using the installation tool.

FIG. 18 is a schematic diagram for explaining a case where the pressure-loss adjusting member is installed by using the installation tool. When the installation tool 70 in a state with the adjusting member gripper 80 gripping the pressure-loss adjusting member 60 is positioned with respect to the lower core support plate 22 and located on the lower core support plate 22, the engagement hole 66 of the gripped pressure-loss adjusting member 60 is positioned above the fuel assembly guide pin 24 on the lower core support plate 22. In this state, when the installation tool 70 is moved downward to approach the lower core support plate 22, the fuel assembly guide pin 24 on the lower core support plate 22 enters into the engagement hole 66 of the pressure-loss adjusting member 60. Therefore, the installation tool 70 is moved closer to a position where the pressure-loss adjusting member 60 comes in contact with the lower core support plate 22, in a state with the fuel assembly guide pin 24 entering in the engagement hole 66. Accordingly, the pressure-loss adjusting member 60 is positioned on the lower core support plate 22.

When the installation tool 70 is moved closer to the lower core support plate 22 and the pressure-loss adjusting member 60 is positioned on the lower core support plate 22 by bringing the pressure-loss adjusting member 60 into contact with the lower core support plate 22, the lower-side support unit 90 of the adjusting member gripper 80 is closed again. In the installation tool 70 when the lower-side support unit 90 is closed, a member for supporting the pressure-loss adjusting unit 61 of the pressure-loss adjusting member 60 is removed in the adjusting member gripper 80. Accordingly, the adjusting member gripper 80 releases the support from below of the pressure-loss adjusting unit 61, and releases grip of the pressure-loss adjusting member 60.

When the lower-side support unit 90 is closed, the insertion portion 85 of the adjusting member gripper 80 including the lower-side support unit 90 can pass through the instrumentation hole 63 of the pressure-loss adjusting member 60. Accordingly, by pulling up the installation tool 70 in this state, the pressure-loss adjusting member 60 does not move, and the insertion portion 85 of the adjusting member gripper 80 is removed from the instrumentation hole 63 of the pressure-loss adjusting member 60 with the pressure-loss adjusting member 60 being arranged on the lower core support plate 22.

In this manner, by gripping the pressure-loss adjusting member 60 to be arranged at a desired position by the installation tool 70, and removing the installation tool 70 in such a state that the pressure-loss adjusting member 60 in a state with the fuel assembly guide pin 24 on the lower core support plate 22 being inserted into the engagement hole 66 is positioned on the lower core support plate 22, the pressure-loss adjusting member 60 is installed at the desired position.

On the contrary, when the pressure-loss adjusting member 60 installed on the lower core support plate 22 is to be removed, the pressure-loss adjusting member 60 is removed by a procedure opposite to the procedure at the time of installing the pressure-loss adjusting member 60. That is, the fuel assembly 31 and the lower nozzle are removed, and the insertion portion 85 of the adjusting member gripper 80 is moved closer to the lower core support plate 22 in a state with the pressure-loss adjusting member 60 being exposed, in a direction facing the lower core support plate 22. In this case, the lower-side support unit 90 provided in the insertion portion 85 is in a closed state.

In this manner, by moving the installation tool 70 downward in the state with the lower-side support unit 90 being closed, the installation tool 70 is brought closer to the lower core support plate 22 from above, and the positioning pin 76 of the installation tool 70 is inserted into the tool positioning hole 78 in the lower core support plate 22. Accordingly, the respective adjusting member grippers 80 of the installation tool 70 are positioned above the arrangement position of the respective fuel assemblies 31.

Therefore, when the installation tool 70 is further brought closer to the lower core support plate 22 in this state, the insertion portion 85 of the adjusting member gripper 80 positioned above the pressure-loss adjusting member 60 enters into the instrumentation hole 63 formed in the pressure-loss adjusting unit 61 of the pressure-loss adjusting member 60. The lower-side support unit 90 is then opened in the state with the insertion portion 85 entering into the instrumentation hole 63. Accordingly, the lower-side support unit 90 supports the pressure-loss adjusting unit 61 from below to sandwich the pressure-loss adjusting unit 61 by the lower-side support unit 90 and the upper-side support unit 86, thereby gripping the pressure-loss adjusting member 60 by the adjusting member gripper 80.

Thereafter, when the installation tool 70 is pulled up, the pressure-loss adjusting member 60 gripped by the adjusting member gripper 80 is removed from the lower core support plate 22. At the time of operation of the reactor 1, a plurality of the pressure-loss adjusting members 60 are arranged on the lower core support plate 22. When the pressure-loss adjusting member 60 is to be removed by the installation tool 70 in this manner, a plurality of the pressure-loss adjusting members 60 are removed at a time.

The installation tool 70 holds a plurality of the adjusting member grippers 80 each of which can freely grip or release the pressure-loss adjusting member 60, by the frame 71 in the same positional relationship as the relative positional relationship between the fuel assemblies 31 arranged in plural on the lower core support plate 22. Accordingly, when the pressure-loss adjusting member 60 is to be arranged at a desired position on the lower core support plate 22, which is located near the bottom of the reactor vessel 10, the pressure-loss adjusting member 60 is gripped by the adjusting member gripper 80 corresponding to a position to arrange the pressure-loss adjusting member 60, of the adjusting member grippers 80 held by the frame 71, and released on the lower core support plate 22, thereby enabling to install the pressure-loss adjusting member 60. As a result, a number of the pressure-loss adjusting members 60 can be easily installed at desired positions. Further, by installing the pressure-loss adjusting members 60 at a time by the installation tool 70, the installing time at the time of installing the pressure-loss adjusting members 60 can be reduced.

Further, because the positioning pin 76 is provided on the frame 71, positioning of the frame 71 with respect to the lower core support plate 22 can be performed easily and reliably. Accordingly, the adjusting member grippers 80 held by the frame 71 can be positioned at appropriate positions on the lower core support plate 22 easily and reliably, at the time of installing the pressure-loss adjusting members 60. As a result, a number of the pressure-loss adjusting members 60 can be installed at desired positions more easily.

When gripping the pressure-loss adjusting member 60, the adjusting member gripper 80 vertically sandwiches the pressure-loss adjusting unit 61 of the pressure-loss adjusting member 60 by the upper-side support unit 86 and the lower-side support unit 90, thereby enabling to grip the pressure-loss adjusting member 60 more reliably. As a result, a number of the pressure-loss adjusting members 60 can be installed at desired positions more reliably.

When gripping the pressure-loss adjusting member 60, the adjusting member gripper 80 supports the pressure-loss adjusting unit 61 of the pressure-loss adjusting member 60 from below by the lower-side support unit 90 by protruding the lower-side support unit 90 capable of protruding horizontally. Therefore, the pressure-loss adjusting member 60 can be gripped more reliably. As a result, a number of the pressure-loss adjusting members 60 can be installed at desired positions more reliably.

When gripping the pressure-loss adjusting member 60, the adjusting member gripper 80 supports the pressure-loss adjusting unit 61 from below by horizontally protruding the lower-side support unit 90, in a state with the insertion portion 85 provided with the lower-side support unit 90 being inserted into the instrumentation hole 63 formed in the pressure-loss adjusting unit 61. Therefore, at the time of supporting the pressure-loss adjusting member 60 from below, the pressure-loss adjusting member 60 can be supported more reliably, thereby enabling to grip the pressure-loss adjusting member 60 more reliably. As a result, a number of the pressure-loss adjusting members 60 can be installed at desired positions more reliably.

In the installation tool 70, the adjusting member gripper 80 can be operated by an air pressure. However, a power source at the time of operating the adjusting member gripper 80 can be other than the air pressure. The adjusting member gripper 80 provided as a pressure-loss adjusting-member gripper grips the pressure-loss adjusting member 60 by turning the lower-side support unit 90 and sandwiching the pressure-loss adjusting unit 61 of the pressure-loss adjusting member 60 by the lower-side support unit 90 and the upper-side support unit 86. However, when the pressure-loss adjusting member 60 is to be gripped, the pressure-loss adjusting member 60 can be gripped by another method other than sandwiching the pressure-loss adjusting unit 61.

The frame 71 provided as a holding unit can be provided in a form other than those of the main frame 72, the sub-frame 73, and the outer frame 74 described above. The frame 71 can be made in any form, as long as it can hold a plurality of the adjusting member grippers 80 as pressure-loss adjusting-member grippers in the same positional relationship as the relative positional relationship between the fuel assemblies 31 arranged in plural on the lower core support plate 22.

Industrial Applicability

As described above, the pressure-loss adjusting-member installation tool according to the present invention is useful at the time of assembling a pressurized water reactor and is particularly suitable for a case that a reactor uses a plurality of types of fuel assemblies.

REFERENCE SIGNS LIST

1 reactor
10 reactor vessel
15 inlet nozzle
16 outlet nozzle
20 core barrel
22 lower core support plate
23 core support plate flow hole
24 fuel assembly guide pin
30 reactor internal
31 fuel assembly
42 lower plenum
50 lower nozzle
56 positioning hole
60 pressure-loss adjusting member
61 pressure-loss adjusting unit
62 pressure-loss adjusting hole
63 instrumentation hole
66 engagement hole
70 installation tool
71 frame
72 main frame
73 sub-frame
74 outer frame
76 positioning pin
78 tool positioning hole
80 pressure-loss adjusting-member gripper
81 gripper body
85 insertion portion
86 upper-side support unit
90 lower-side support unit
93 rotation shaft

The invention claimed is:

1. A pressure-loss adjusting-member installation tool comprising:
a plurality of pressure-loss adjusting-member grippers being configured to freely grip or release a pressure-loss adjusting member which is arranged at a position between a lower nozzle arranged at one end of a fuel assembly having a relatively small pressure-loss when a primary coolant flows and a lower core support plate, and which can cause the primary coolant to pass therethrough in a state with a pressure-loss being increased more than that of when the primary coolant passes through only core support plate flow holes formed on the lower core support plate, and
a holding unit that holds the plurality of the pressure-loss adjusting-member grippers in a same positional relationship as a relative positional relationship between the fuel assemblies arranged in plural on the lower core support plate, wherein each of the plurality of pressure-loss adjusting-member grippers includes an insertion portion, which is inserted into a hole formed in a horizontal member included in the pressure-loss adjusting member, and a lower-side support unit which is pivotally attached to the pressure-loss adjusting-member gripper, the lower-side support unit is protruded in a state with the insertion portion being inserted into a hole in the pressure-loss adjusting member such that when the lower-side support unit is pivoted, the lower-side support unit engages the pressure-loss adjusting-member and the lower-side support unit supports the horizontal member from below.

2. The pressure-loss adjusting-member installation tool of claim 1, wherein the holding unit includes a positioning portion relative to the lower core support plate.

3. The pressure-loss adjusting-member installation tool of claim 1, wherein each of the pressure-loss adjusting-member grippers grips the pressure-loss adjusting member by vertically sandwiching the horizontal member included in the pressure-loss adjusting member.

\* \* \* \* \*